United States Patent [19]
Cox et al.

[11] Patent Number: 4,734,108
[45] Date of Patent: Mar. 29, 1988

[54] GAS SCRUBBING APPARATUS AND PROCESS

[76] Inventors: James P. Cox; Kelly K. Cox, both of 246 E. Bartlett Rd., Lynden, Wash. 98264

[21] Appl. No.: 739,647

[22] Filed: May 31, 1985

[51] Int. Cl.$^4$ ............................................ B01D 47/00
[52] U.S. Cl. ........................................ 55/84; 55/89; 55/230; 55/257 C; 55/279; 55/233; 55/220; 366/341; 204/157.3
[58] Field of Search ............... 55/90, 89, 84, 279, 55/15, 230, 235, 277, 417, 420, 257 C; 261/94–98, 36 R, 106, 22, 114 VP, 118; 422/24; 137/846; 98/116, 119; 366/341; 204/157.3

[56] References Cited

U.S. PATENT DOCUMENTS

| | | | |
|---|---|---|---|
| 339,669 | 4/1886 | Lillie | 55/233 |
| 615,751 | 12/1898 | Sands | 137/846 |
| 1,620,826 | 3/1927 | Mitchell | 261/22 |
| 2,907,404 | 10/1959 | Mare | 55/277 |
| 3,210,914 | 10/1965 | Eckert | 55/233 |
| 3,255,571 | 6/1966 | Walker et al. | 55/277 |
| 3,757,495 | 9/1973 | Sievers | 422/24 |
| 3,898,308 | 8/1975 | Baum | 261/DIG. 54 |
| 3,957,464 | 5/1976 | Teller | 55/89 |
| 3,996,317 | 12/1976 | Sarmiento et al. | 261/113 |

FOREIGN PATENT DOCUMENTS 804696 4/1951 Fed. Rep. of Germany ........ 261/22

OTHER PUBLICATIONS

McGraw-Hill Encyclopedia of Science and Technology, 1971 Edition, vol. 1, p. 241; vol. 4, pp. 333 and 334; vol. 6, pp. 47, 48 and 49.

Primary Examiner—Bernard Nozick
Attorney, Agent, or Firm—Robert W. Beach; Ward Brown

[57] ABSTRACT

Scrubbing apparatus for effecting contact between polluted air and a scrubbing liquid may define a serpentine path mounted on a rooftop, a tank in which contact between the polluted gas and the scrubbing liquid is effected by projecting the scrubbing liquid onto a rotating propeller to effect atomization of the scrubbing liquid or contact between the scrubbing liquid and the polluted air can be effected by dripping scrubbing liquid onto filters through which the polluted air passes. Purification of the scrubbing air is enhanced by producing turbulence in the air carrying the scrubbing liquid by passing the air carrying the scrubbing liquid between closely adjacent, flexible, vibrating sheets disposed parallel to the gas flow. The vibrating characteristics of the flexible sheets can be altered by stretching such sheets and/or by placing such sheets alongside a hard surface struck by the flexible sheets.

42 Claims, 54 Drawing Figures

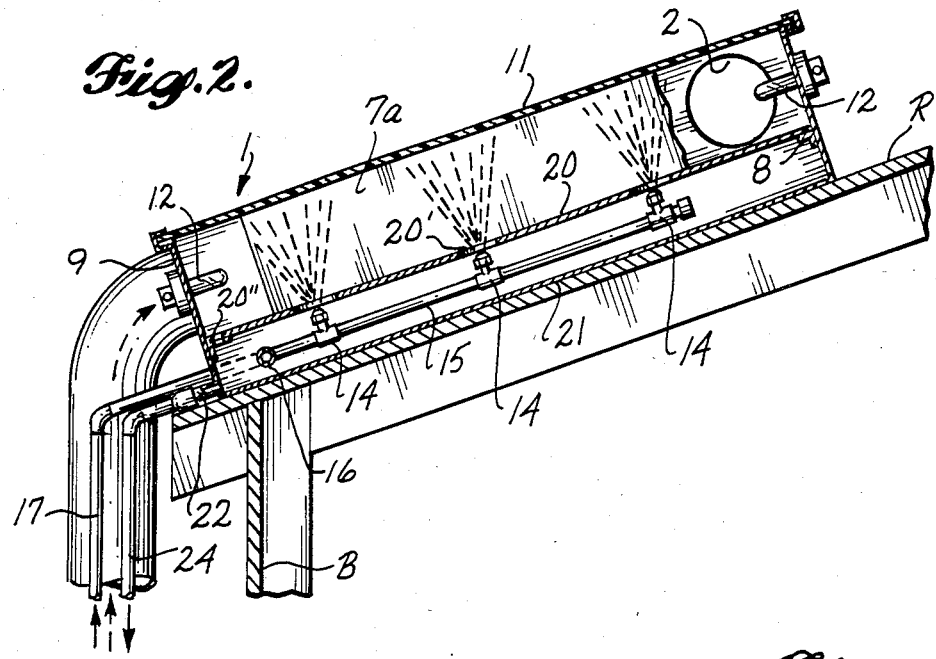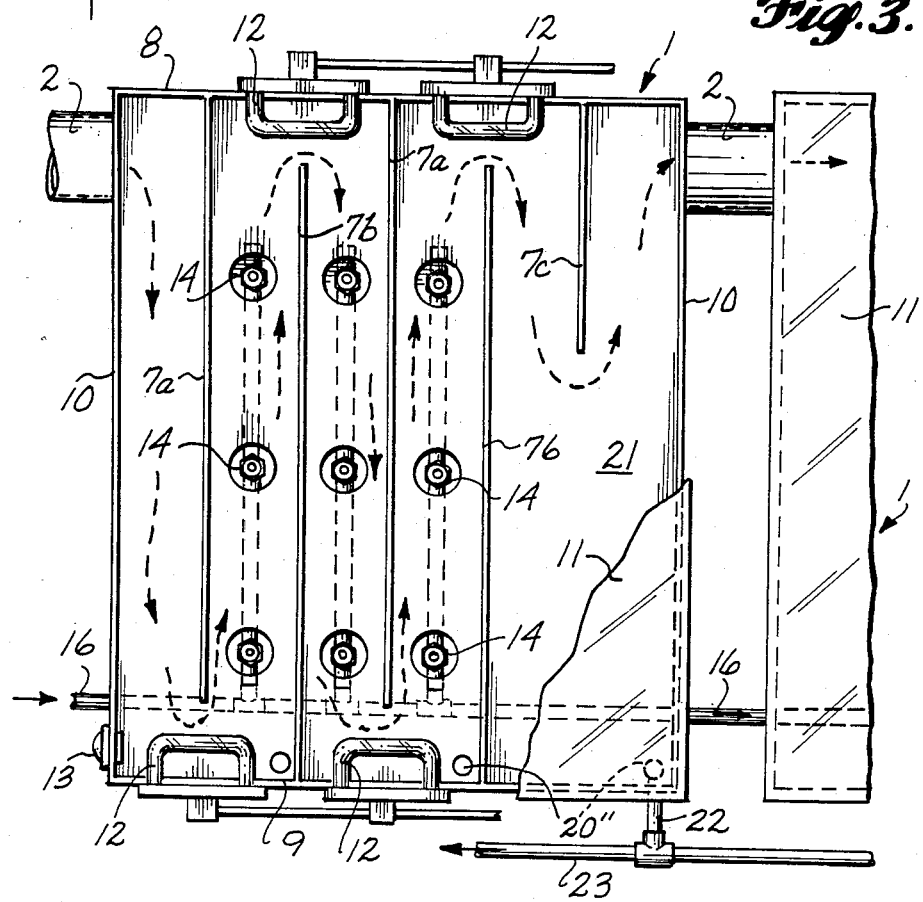

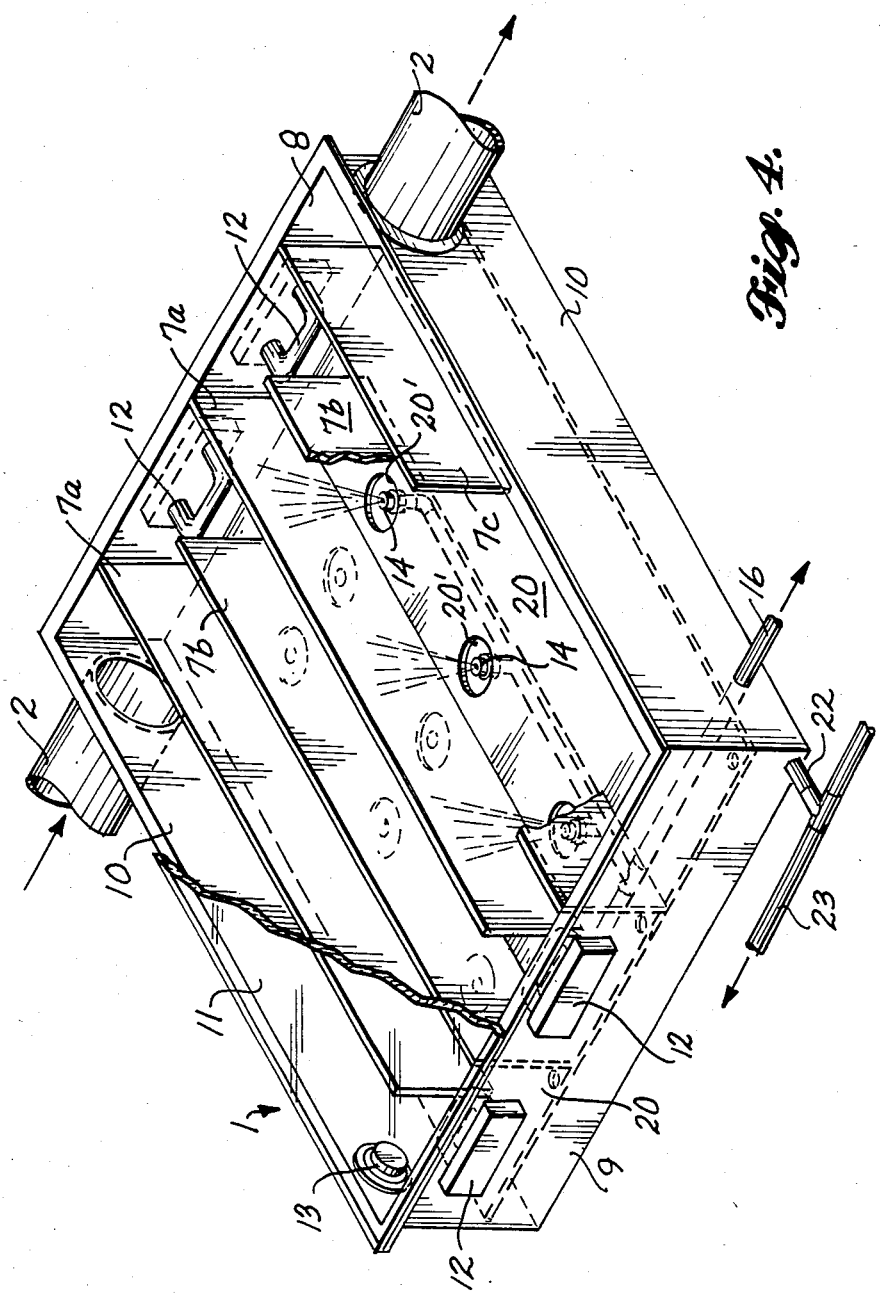

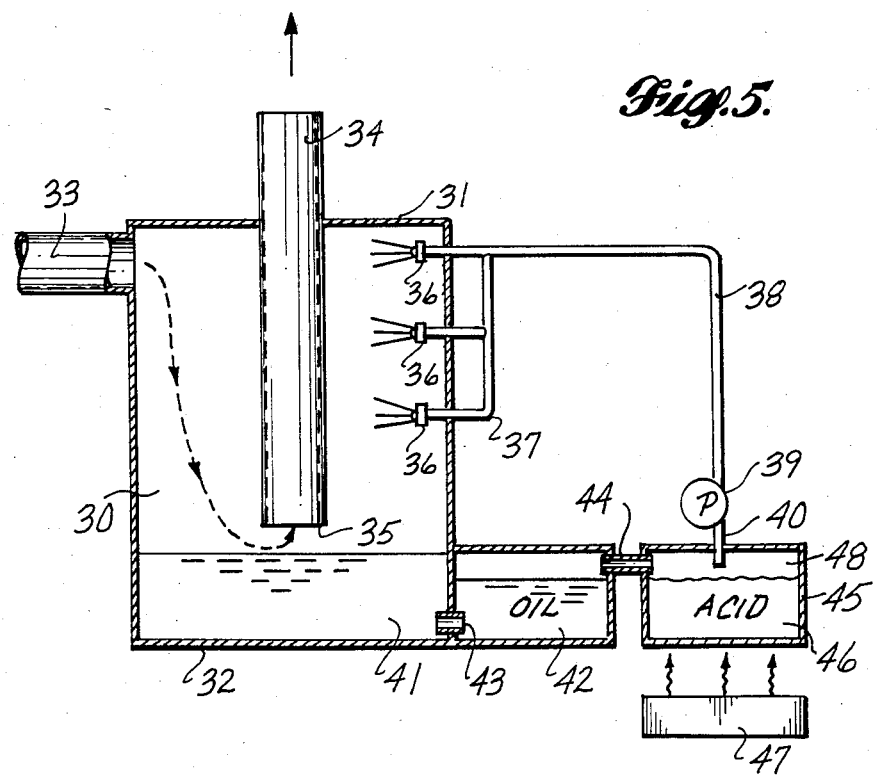
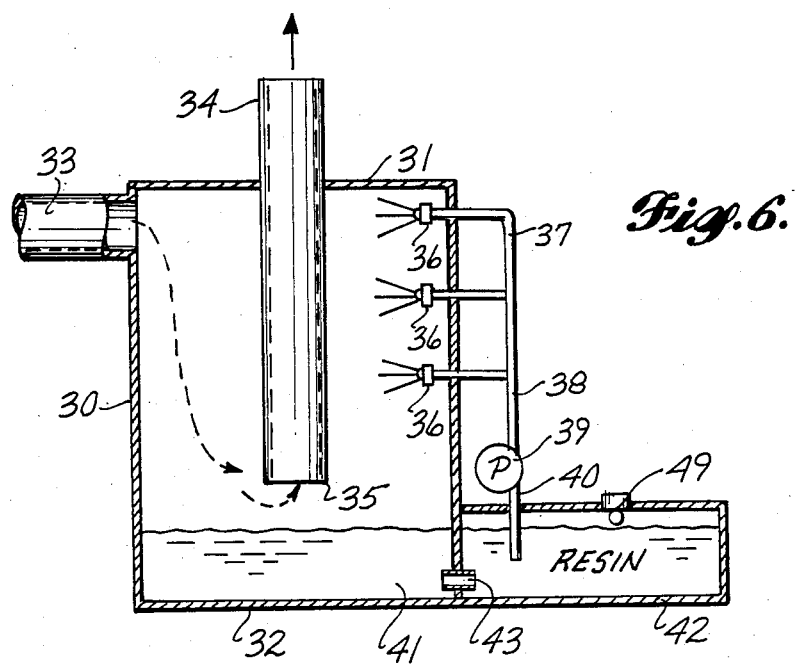

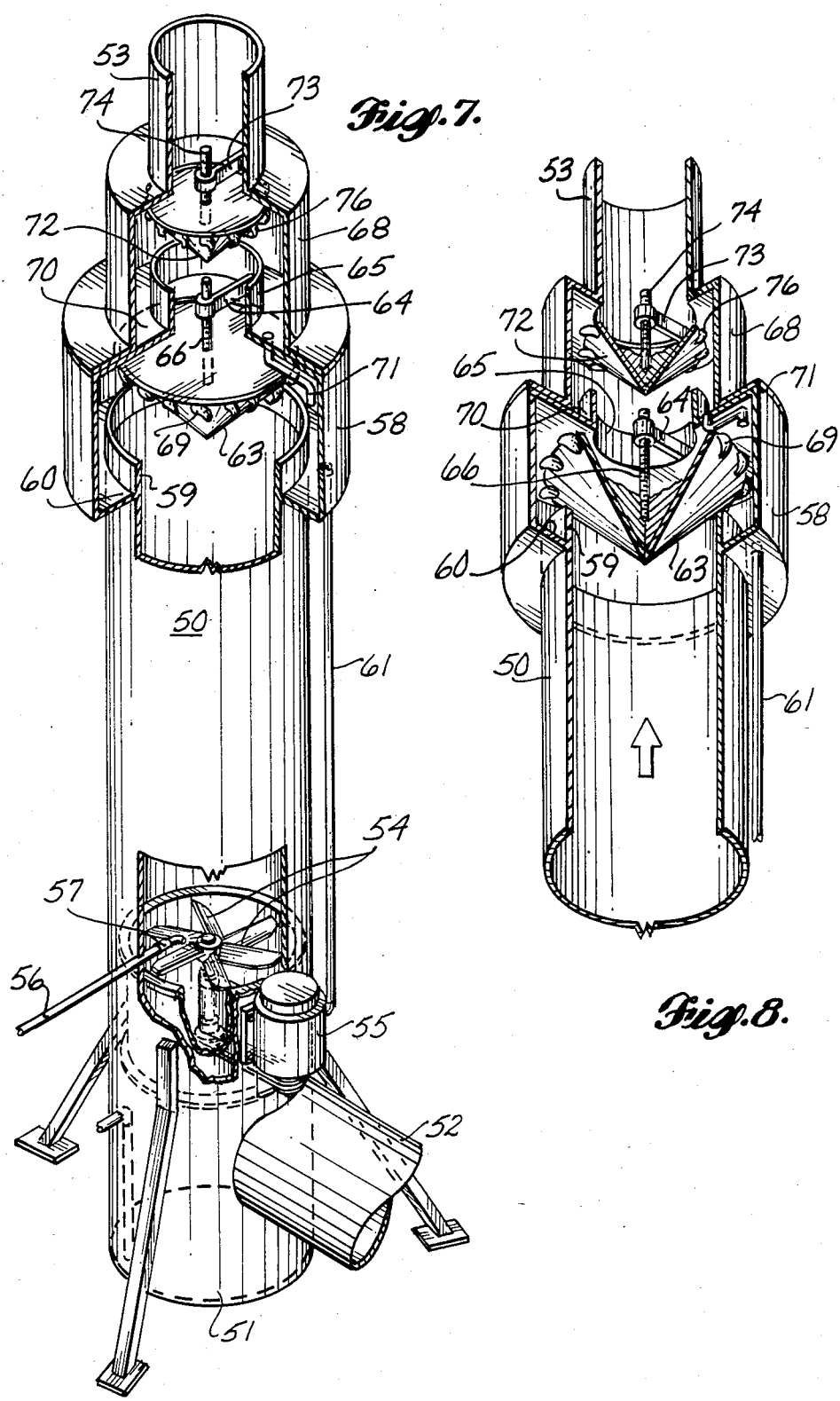

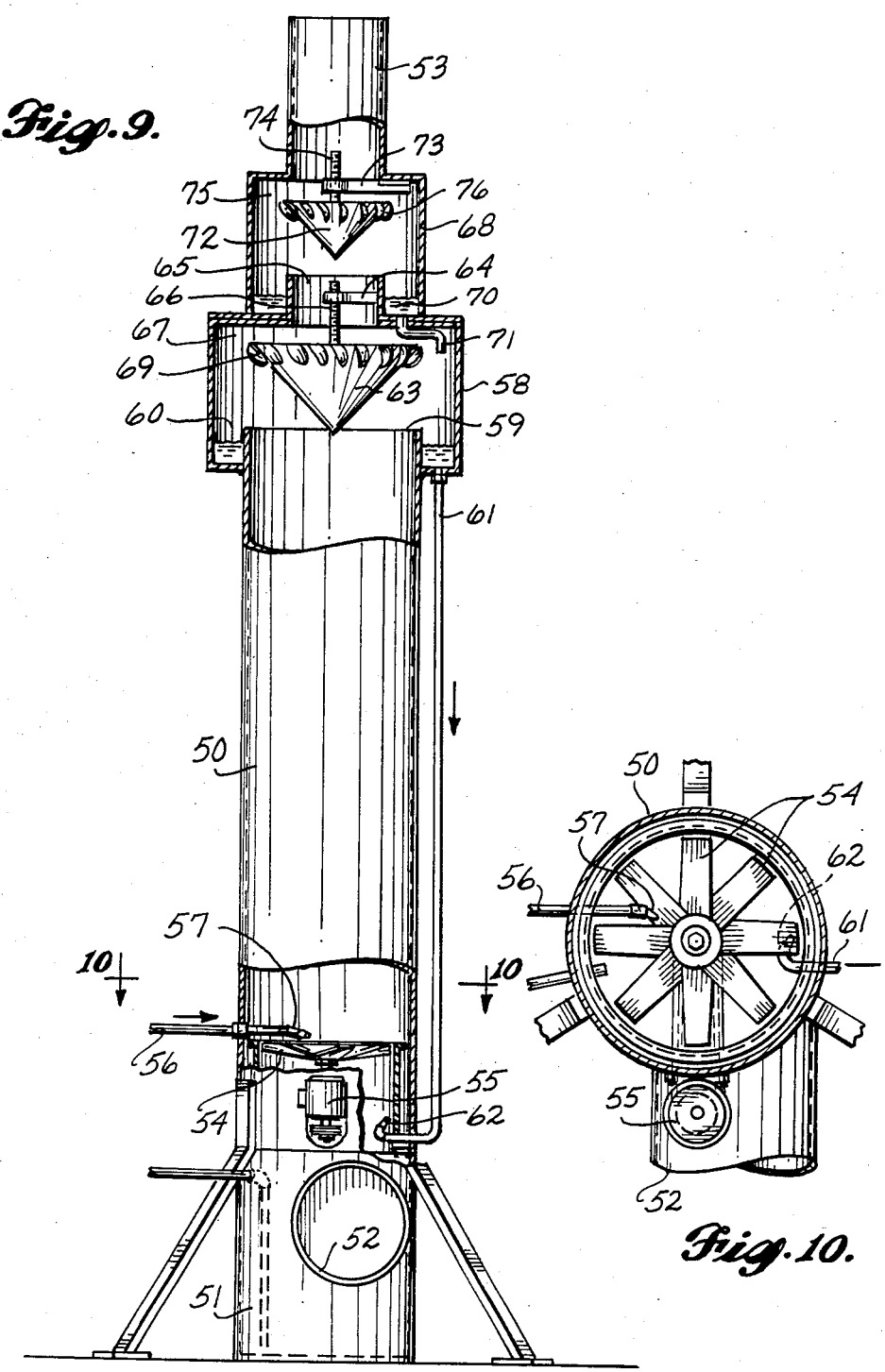

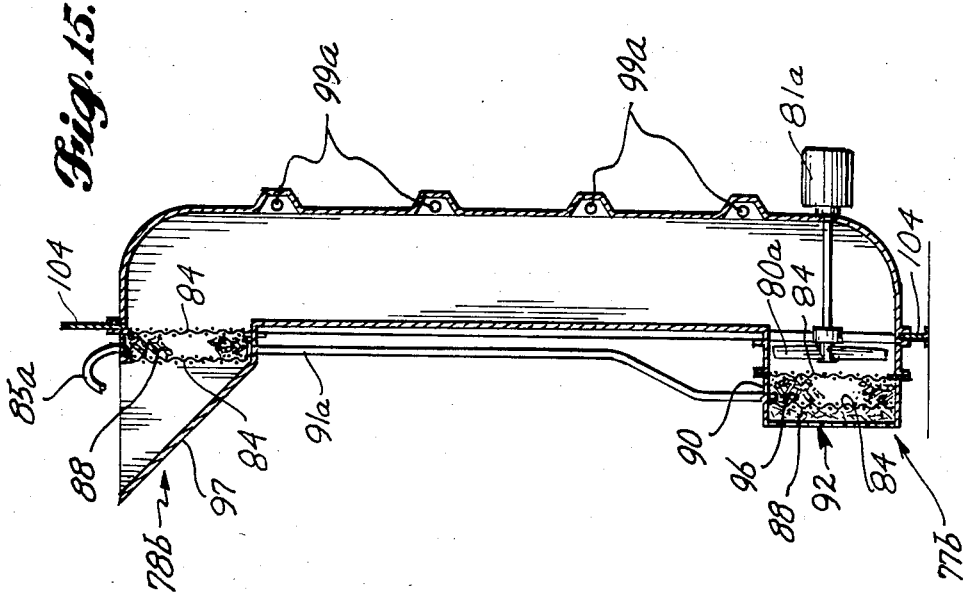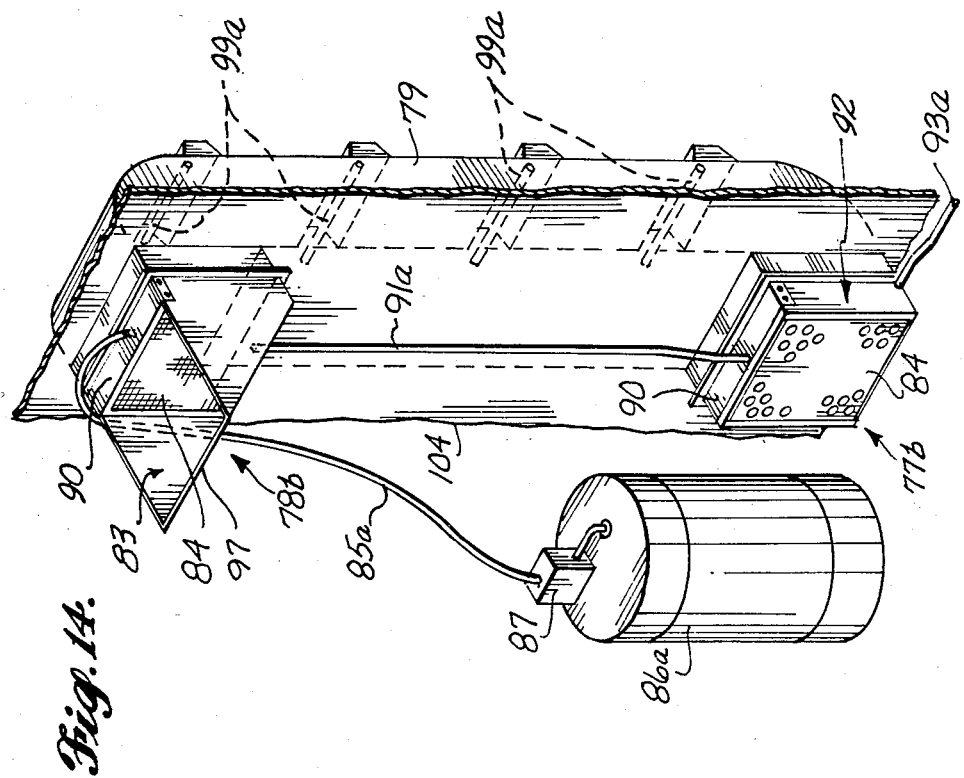

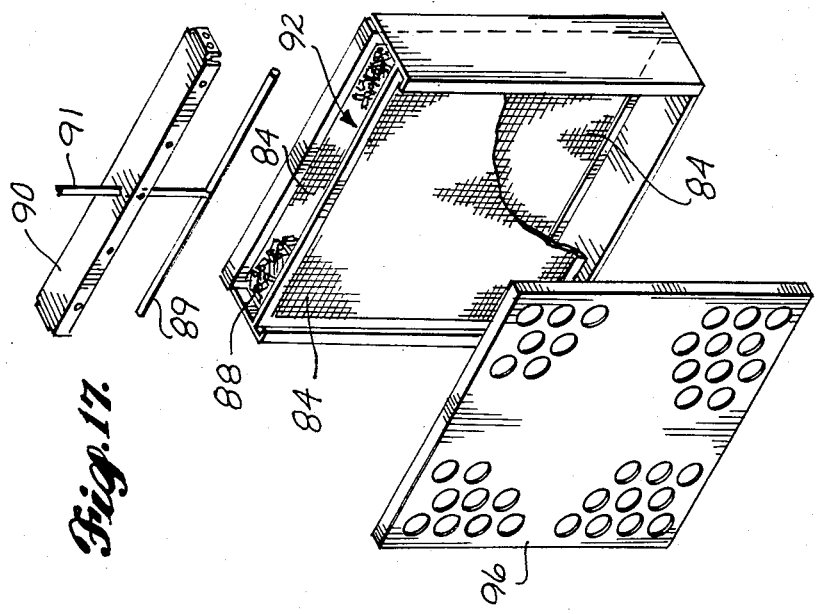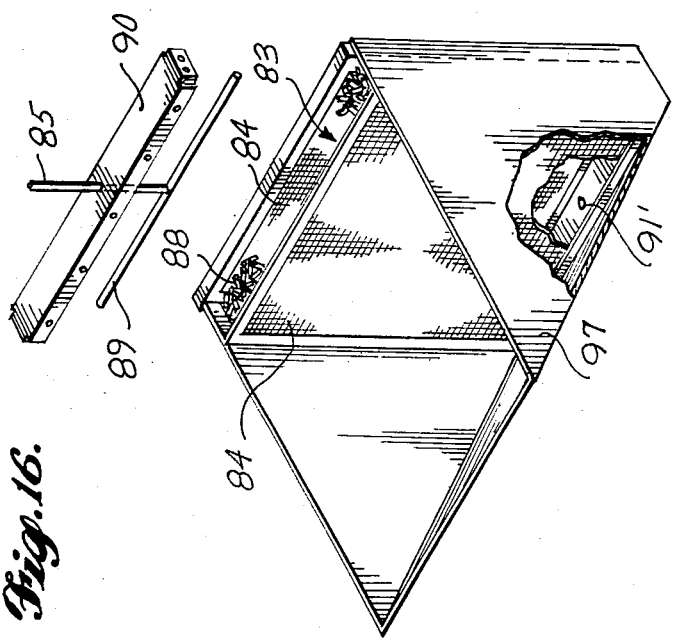

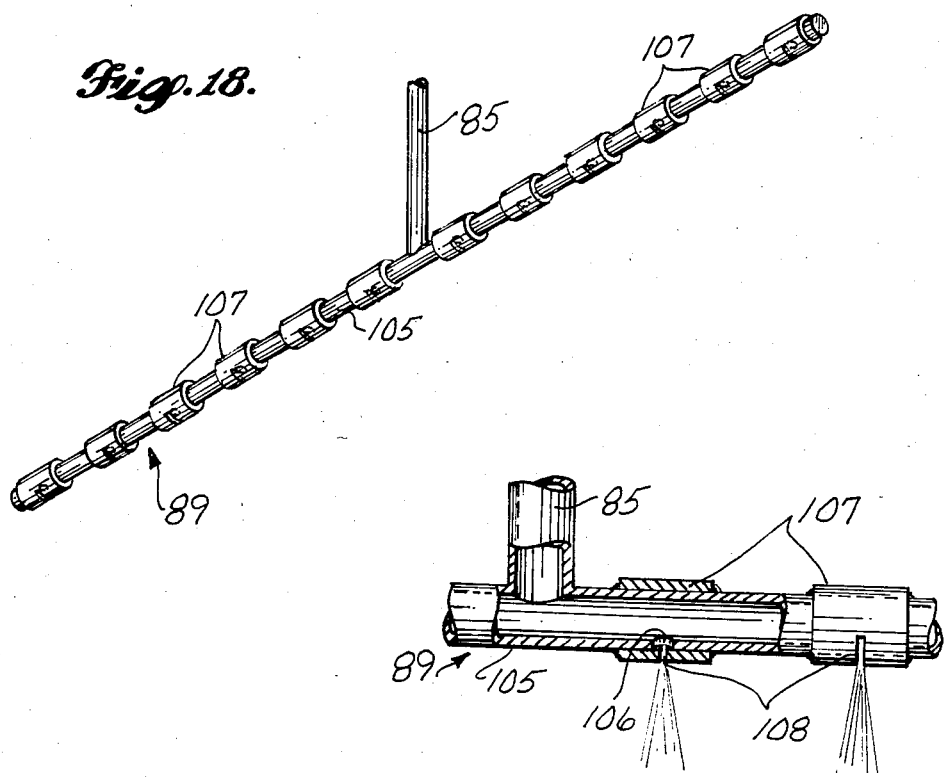
Fig. 18.
Fig. 19.
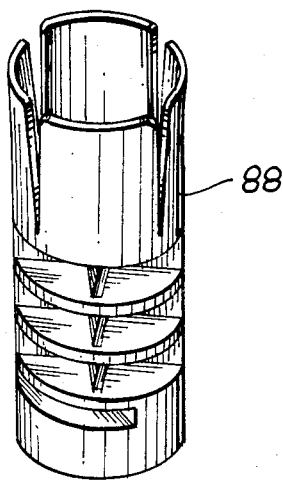
Fig. 20.

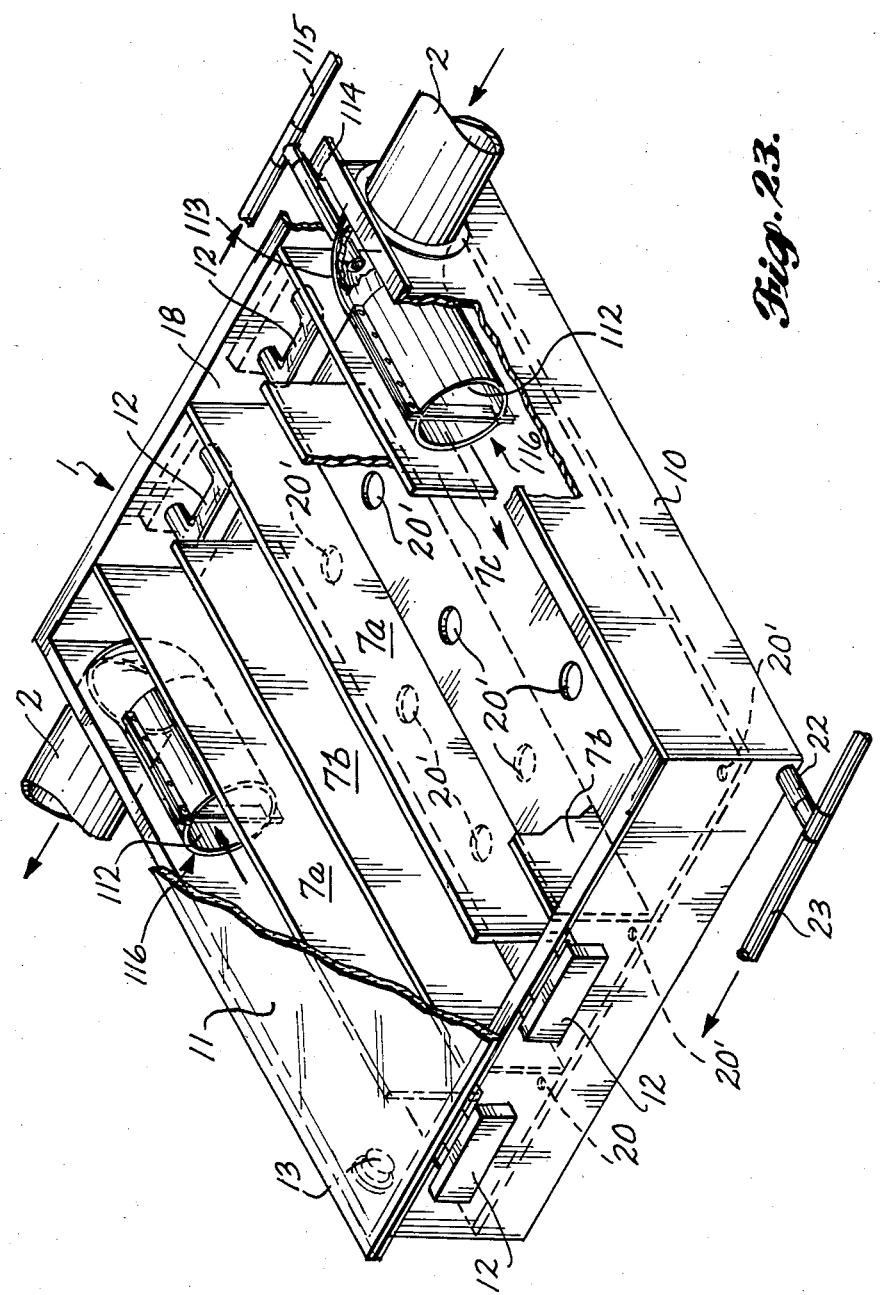

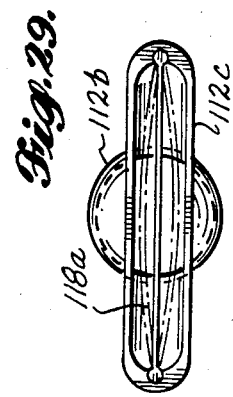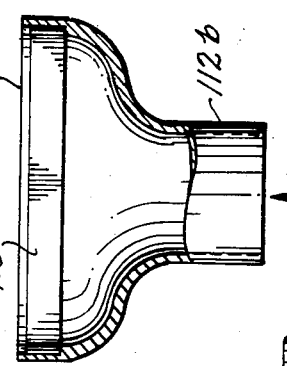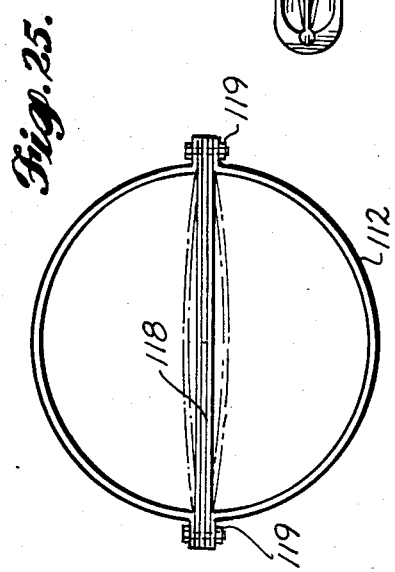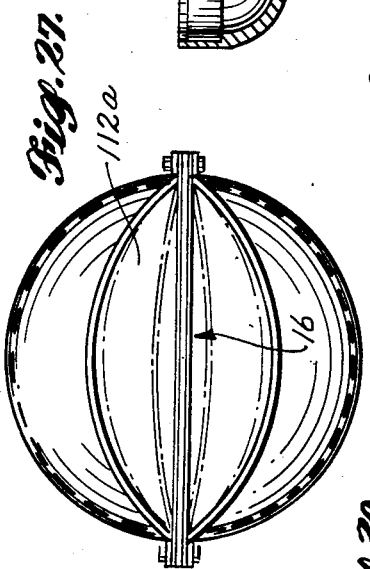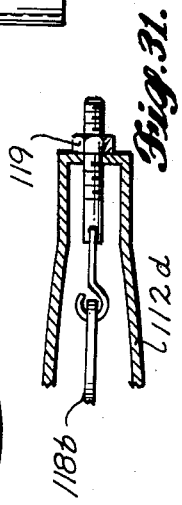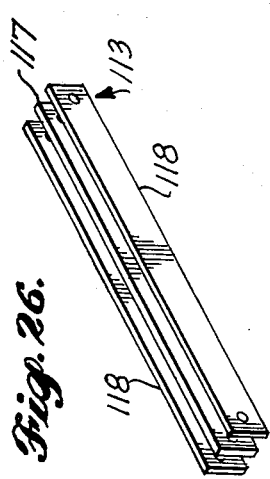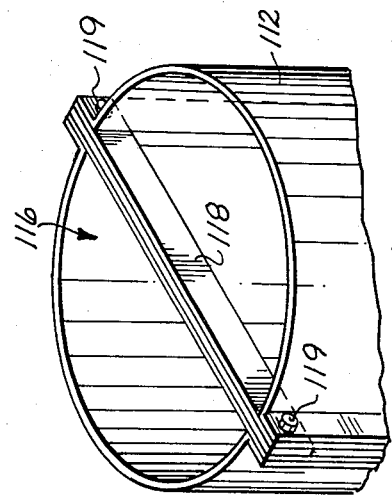

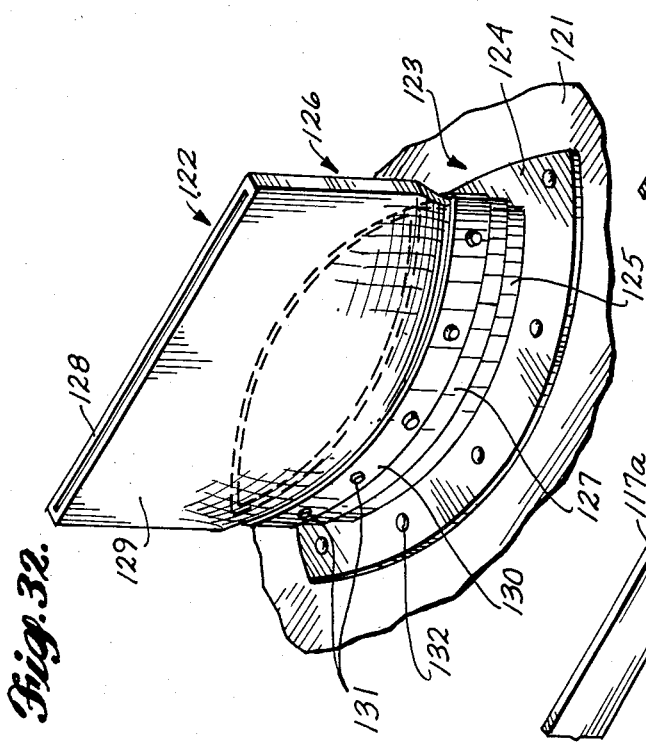

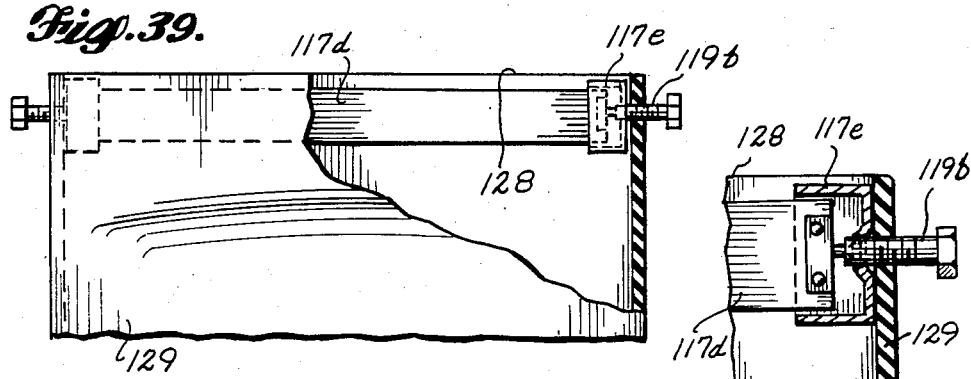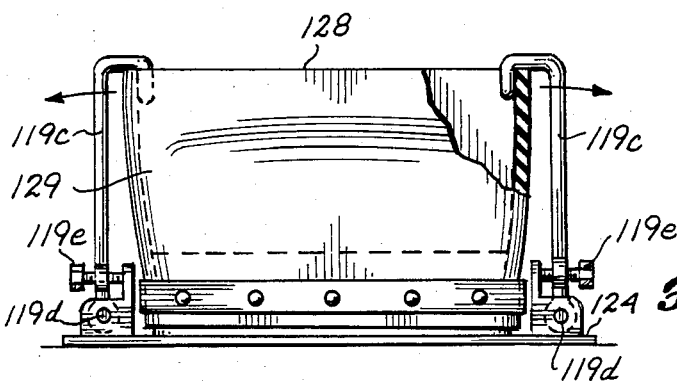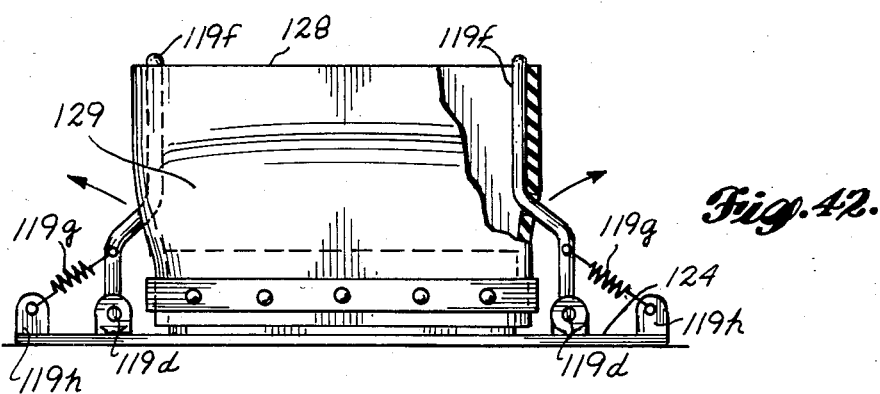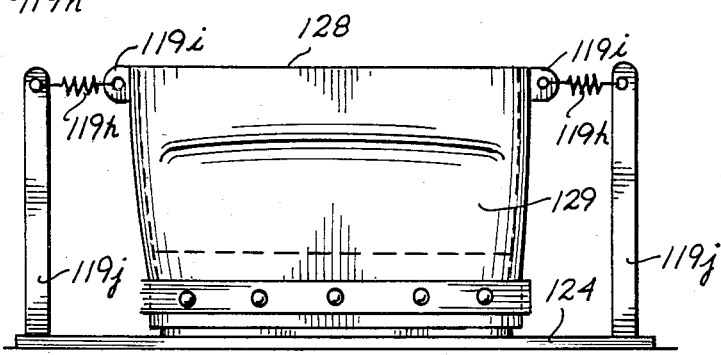

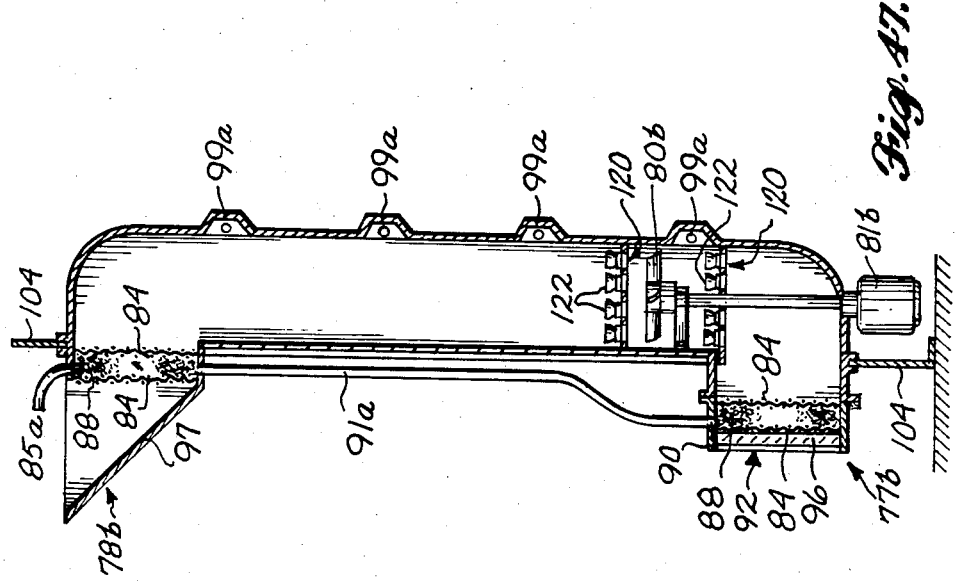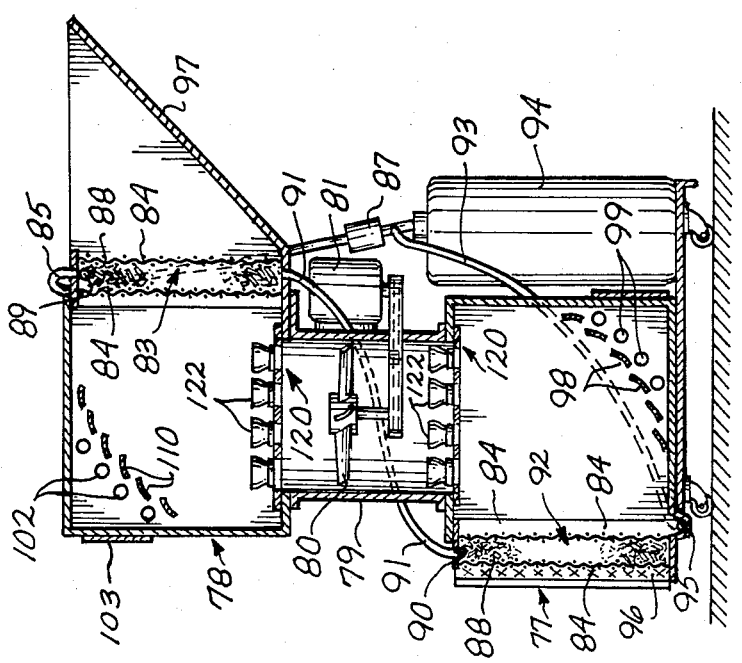

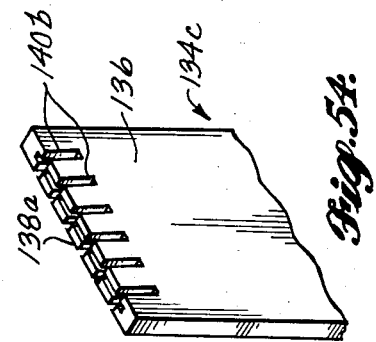
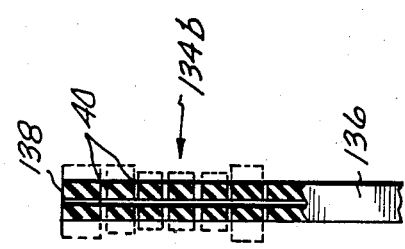
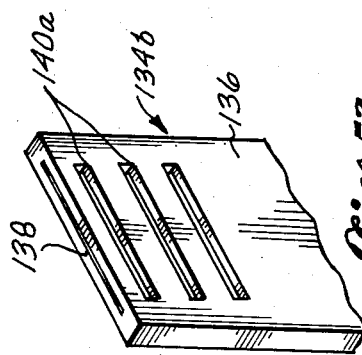
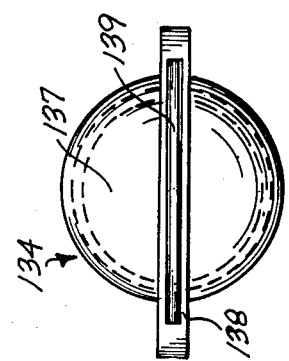
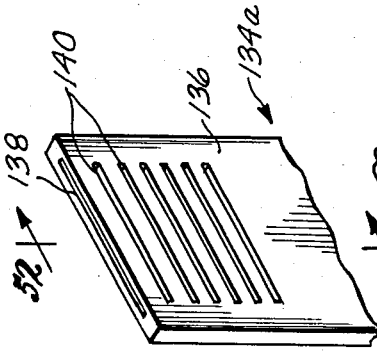
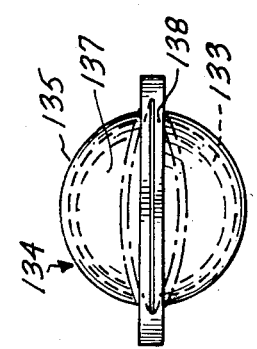
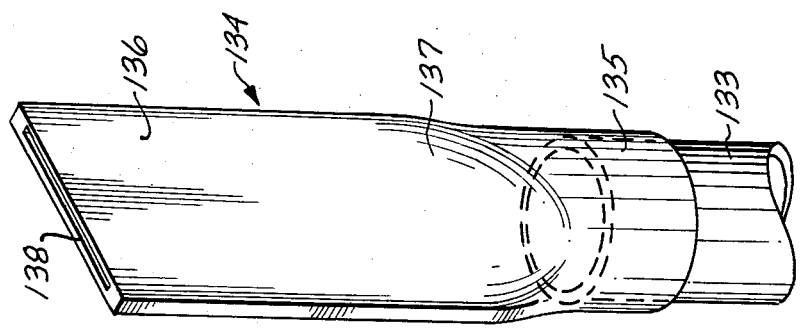

GAS SCRUBBING APPARATUS AND PROCESS

RELATED APPLICATION

This application is related to the copending application of James P. Cox and Robert W. Duffy Cox Ser. No. 662,331, entitled Air Scrubbing Process Apparatus and Scrubbing Liquid, filed Oct. 17, 1984 now abandoned.

BACKGROUND OF THE INVENTION

1. Field of the Invention

This invention relates to scrubbing apparatus for purifying gas, particularly air, by intimate contact with an effective scrubbing liquid for a sufficiently extended period to purge the gas of pollutants, particularly styrene, and to purifying treatment of such a gas which is dynamically vibrated or agitated.

2. Problem

Air pollutants are of particulate character, of gaseous character, or both, and such pollutants result principally from industry or combustion. Industrial sources include ventilation products from local exhaust systems, such as from plastics manufacturing and processing plants, and process waste discharges, as well as from combustion. Air pollutants may be more or less odorous and/or pungent and/or noxious.

Known pollution control systems do not completely or effectively remove from air certain pollutants, such as those arising from paint booths, plastics fabricators, particularly those using styrene, and some petroleum processes.

Emissions from sewage and sludge treatment, restaurants, renderers, brewers and distillers, fish reduction and processing plants, pulp and paper mills, fertilizer processors and manufacturers, poultry and poultry processing operations, coffee roasting, garbage and garbage incineration, paint booths, internal combustion exhaust, plastics industries such as those which use styrene, petroleum processes, smelting and mining operations, swine, and other domestic stock and fowl raising, food processing operations, various chemical operations and operations such as printing where odoriferous materials are employed are amenable to treatment, at least to some extent, by the present invention.

3. Prior Art

The objective of prior air-cleaning processes has been to remove particulate matter and/or noxious gases and pungency. To remove particulate material, cyclone separators, bag filters and electrostatic precipitators have been used. In wet scrubbers, water is sprayed in atomized condition over a geometric shape or packed bed to remove water-soluble gases.

A typical cyclonic spray scrubber is shown in Figure 2 and a typical venturi scrubber is shown in Figure 3 on page 241 of Volume 1 of the *McGraw-Hill Encyclopedia of Science and Technology*, 1971 edition. A cyclone dust separator, a cloth collector and an additional view of a cyclonic liquid scrubber are shown on pages 333 and 334 of Volume 4 of the same publication.

In column 2 on page 47 of Volume 6 of the same encyclopedia it is stated that recovery of solute gases is generally achieved by contacting the gas streams with a liquid that offers specific or selective solubility for the solute gas to be recovered. By such procedure mercaptans can be removed from natural gas, or carbon monoxide can be recovered from process streams in petrochemical synthesis. Fluorides can be recovered from emissions from fertilizer and aluminum manufacture and sulfur dioxide can be recovered from metallurgical operations. Figure 1 on page 48 shows a diagram of a packed tower for gas absorption, Figure 2 shows a wet cyclone peripheral spray tower and Figure 3 on page 49 shows a plate tower or impingement baffle scrubber. Page 49 states that the packed tower is used most extensively in absorption operations because of its inherent differential mechanism and lower power consumption.

Thus various procedures have been used to purify air with greater or less success but conventional procedures have been unable to remove certain pollutants, such as styrene, from air. Also, air-filtering processes generally have required the expenditure of considerable power, or have utilized expensive equipment and/or materials, or have been of limited capacity, or have employed frequent and expensive reconditioning of sorption materials.

SUMMARY OF THE INVENTION

It is the principal object of the present invention to provide intimate contact between a scrubbing liquid and air to be purified while moving the air rapidly with minimum friction so as to avoid excessive use of power while passing a considerable volume of air through the scrubber.

A further object is to provide scrubbing apparatus and a process which will be effective for contacting a scrubbing liquid with the air to be purified but which will enable the scrubbing liquid to be recovered and reconditioned for reuse.

Another object is to provide apparatus in which prolonged contact between scrubbing liquid and air to be purified is effected by spraying the scrubbing liquid into air while it is traversing a long path in a comparatively compact apparatus.

It is also an object to provide apparatus which will effect an intimate mixing action of scrubbing liquid and air to be purified with a minimum expenditure of energy.

A particular object is to provide apparatus which will remove styrene from air effectively and substantially completely.

In treating gas to remove pollutant from it by the use of a scrubbing medium or other treatment, it is an object to agitate the gas vigorously to increase the intimacy of contact between the pollutant and the scrubbing medium and/or to promote coalescence of pollutant particles to facilitate their precipitation.

The foregoing objects can be accomplished by scrubbing apparatus providing a long serpentine path in compact apparatus for flow of air to be purified and spraying scrubbing liquid into the air while it is traversing such path. Such objects can also be accomplished by atomizing scrubbing liquid and mixing it intimately with air to be purified, such as by projecting a stream of scrubbing liquid onto a propeller which drives the air to be purified through the scrubber or by passing air through a bed of small articles which carry scrubbing liquid on their surfaces.

Scrubbing liquid can also be projected into a flow of air to be purified following which the airflow is agitated rapidly so as to effect intimate mixing of the scrubbing liquid with the air.

During rapid agitation of polluted air, or the passage of such air through a path into which scrubbing liquid is sprayed, or the air is otherwise exposed to scrubbing medium, the air may be subjected to sunlight and/or ultraviolet light to promote polymerization of vaporous pollutants, such as styrene, for converting them into solid particulate form, such as polystyrene.

BRIEF DESCRIPTION OF THE DRAWINGS

FIG. 2 is a vertical section through a scrubbing chamber of the apparatus shown in FIG. 1.

FIG. 3 is a top plan of a scrubbing unit of the apparatus shown in FIG. 1.

FIG. 4 is a top perspective of a scrubbing unit of the apparatus shown in FIG. 1, parts being broken away.

FIG. 5 is a vertical section through an alternative type of scrubber.

FIG. 6 is a vertical section through a modified scrubber of the general type shown in FIG. 5.

FIG. 7 is a top perspective of another type of scrubber having parts broken away.

FIG. 8 is a bottom perspective of a portion of such scrubber with parts broken away.

FIG. 9 is a side elevation of the scrubber shown in FIG. 7 with parts broken away.

FIG. 10 is a horizontal section through the scrubber of FIG. 9 taken on line 10—10 of that figure.

FIG. 14 is a top perspective of a scrubber suitable for mounting in a wall, and FIG. 15 is a vertical section through such a scrubber.

FIG. 16 is a top perspective of components of the scrubbers shown in FIGS. 11 to 15, inclusive, in exploded relationship and with parts broken away.

FIG. 17 is a top perspective of other components of the scrubbers shown in FIGS. 11 to 15, inclusive, having parts in exploded relationship and parts broken away.

FIG. 18 is a bottom perspective of an element of the scrubber components shown in FIGS. 16 and 17. FIG. 19 is a side elevation of a portion of the element shown in FIG. 18 with parts broken away.

FIG. 20 is a top perspective of another element of the components shown in FIGS. 16 and 17.

FIG. 23 is a top perspective of a unit of scrubbing apparatus similar to FIG. 4 but including dynamic agitators or turbulent mixers. FIG. 24 is a top perspective of a dynamic agitator or turbulent mixer component incorporated in the apparatus shown in FIG. 23, and FIG. 25 is an end elevation of such component. FIG. 26 is a top perspective of a portion of the dynamic agitator or turbulent mixer component showing parts in exploded relationship.

FIG. 27 is an end elevation of a dynamic agitator or turbulent mixer component alternative to that shown in FIG. 25.

FIG. 28 is a side elevation of a further type of dynamic agitator or turbulent mixer having parts broken away, and FIG. 29 is an end view of such an agitator or mixer.

FIG. 30 is an enlarged detail end view of a modified dynamic agitator or turbulent mixer of the general type shown in FIGS. 28 and 29, and FIG. 31 is a fragmentary enlargement of a portion of the dynamic agitator or turbulent mixer shown in FIG. 30.

FIG. 32 is a top perspective of another type of dynamic agitator. FIG. 33 is a plan of such an agitator, and FIG. 34 is a section taken along line 34—34 of FIG. 33.

FIG. 35 is a fragmentary top perspective of the end portion of a dynamic agitator of the type shown in FIGS. 32, 33 and 34, somewhat modified. FIGS. 36, 37 and 38 are top perspectives of alternative types of components that can be used in the dynamic agitators shown in FIG. 35.

FIG. 39 is a fragmentary side elevation of a portion of a dynamic agitator similar to that shown in FIG. 35, but having a modified construction, parts being broken away.

FIG. 40 is an enlarged detail section of a portion of the dynamic agitator shown in FIG. 39.

FIGS. 41, 42 and 43 are side elevations of dynamic agitators generally of the type shown in FIGS. 32, 33 and 34, but having different types of additional components, parts of the agitator being broken away in FIGS. 41 and 42.

FIG. 46 is a vertical section through a scrubber similar to FIG. 12 but incorporating dynamic agitators or turbulent mixers.

FIG. 47 is a vertical section through a scrubber similar to FIG. 15, but incorporating dynamic agitators or turbulent mixers.

FIG. 48 is a top perspective of a dynamic agitator or turbulent mixer of the general type shown in FIGS. 32 to 34, inclusive, but having a somewhat modified construction. FIG. 49 is an end view of the dynamic agitator or turbulent mixer shown in FIG. 48.

FIG. 50 is an end view of an agitator similar to that shown in FIG. 49 but having a slightly modified construction.

FIG. 51 is a fragmentary top perspective of a dynamic agitator or turbulent mixer of the general type shown in FIGS. 48 and 49 but having a somewhat modified construction, and FIG. 52 is a section through such dynamic agitator or turbulent mixer taken on line 52—52 of FIG. 51.

FIG. 53 is a fragmentary top perspective of a dynamic agitator or turbulent mixer similar to that shown in FIGS. 48 and 49 but modified somewhat from the dynamic agitator or turbulent mixer shown in FIG. 51.

FIG. 54 is a fragmentary top perspective of a dynamic agitator or turbulent mixer of the general type shown in FIGS. 48 and 49 modified differently from the modifications shown in FIGS. 51 and 53.

DETAILED DESCRIPTION

Figure 1:
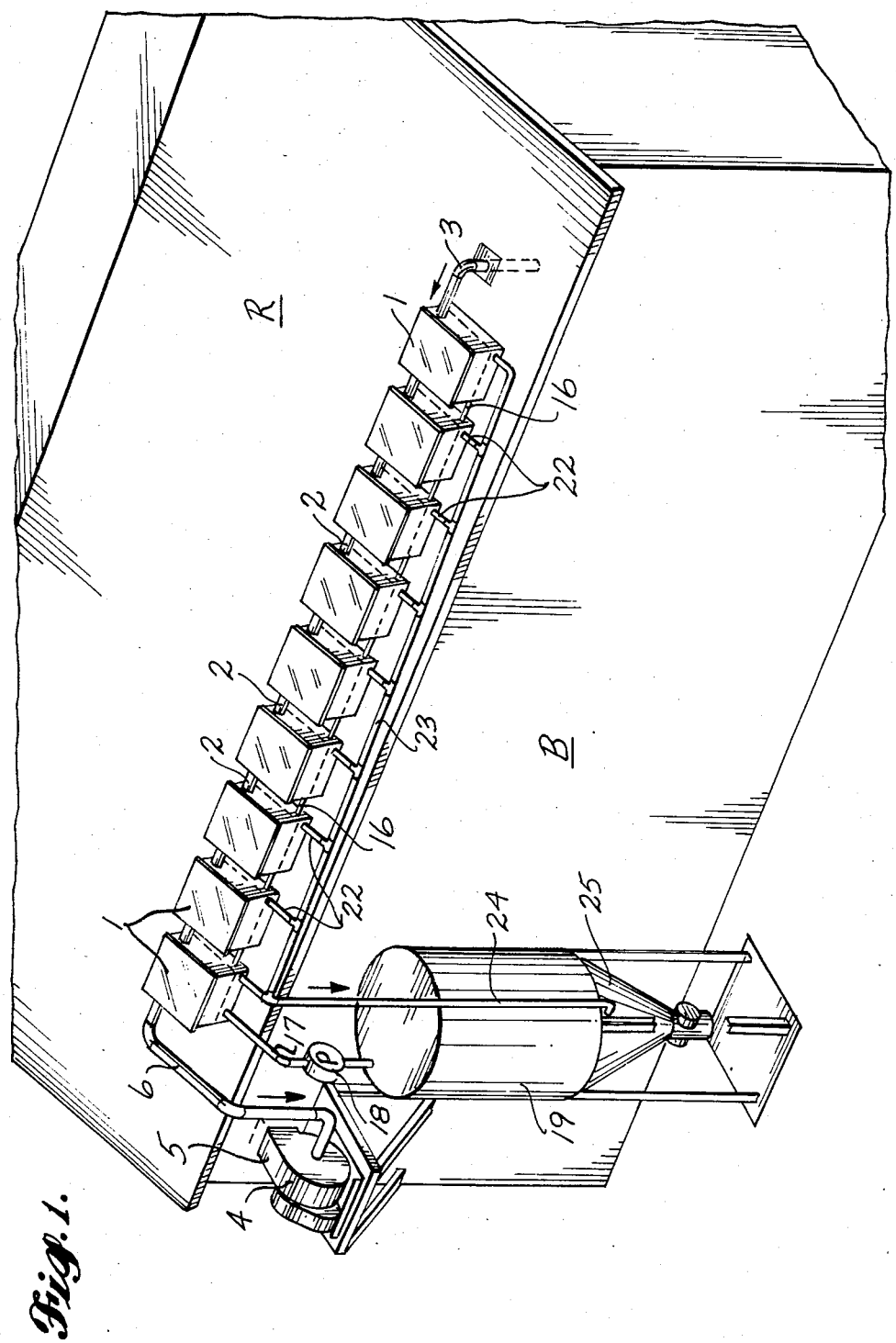
FIG. 1 is a top perspective of a scrubber installation including scrubbing chambers mounted on a roof.

The apparatus shown in FIGS. 1 to 4 of the drawings is particularly effective for removing styrene from the atmosphere of industrial plants using polystyrene resins. Such apparatus includes a number of scrubbing chambers 1 mounted on the sloping roof R of a building B in which polystyrene resins are being manufactured or are being used for fabricating articles. The scrubbing chambers 1 are connected in series by ducts 2. Air from the building B is drawn through a supply pipe 3 and scrubbing chambers connected to such pipe by a blower 4. The purified air is discharged from the series of scrubbing chambers through a discharge duct 6 connected to the intake of blower 4, the discharge duct 5 of which blower is connected to building B to return the purified air to it.

The construction of the individual scrubbing chambers is shown in FIGS. 2, 3 and 4 as including partitions which form a serpentine passage through each chamber between the ducts 2 connecting such chamber to the adjacent chambers. Partitions or baffles 7a extend from the upper wall 8 of the sloping chamber 1 downward toward the lower wall 9 and their lower ends are spaced from such lower wall a distance approximately equal to the transverse spacing between the partitions 7a and 7b. The alternate partitions or baffles 7b located midway between adjacent partitions 7a extend from the lower wall 9 up the roof toward the upper wall 8 and their upper ends are spaced from such upper wall a distance approximately equal to the transverse spacing between the partitions 7a and 7b. Consequently, the space between the baffles or partitions provides a serpentine path of generally constant cross section through the scrubbing chamber in which the flow of air passes through successive return bends. Such baffles or partitions are arranged between sidewalls 10. The baffle 7c closest to the outflow duct 2 may extend downward from the upper wall 8 but can be considerably shorter than the partitions 7a.

The top of the scrubbing chamber is closed by a lid 11. Such lid is transparent and preferably of a material which will pass sunlight, the ultraviolet light of which will act to polymerize styrene carried by the air flowing through the scrubbing chamber to convert it to polystyrene particulates. The sunlight can be supplemented by light produced by ultraviolet light generators 12 mounted on the end walls 8 and 9 of the scrubbing chamber. Energization of such ultraviolet light generators can be controlled by the light-sensing control 13 so that such generators will be energized when the intensity of the sunlight or daylight is reduced below a predetermined level at which the control is set to operate.

Nozzles 14 carried by branch pipes 15 spray scrubbing liquid into the serpentine path of the air flowing through the scrubbing units 1. As shown in FIG. 1, scrubbing liquid is supplied to such branch pipes by the header 16 from a supply pipe 17 by a pump 18 which pumps the scrubbing liquid from a reservoir 19. Such liquid may be of the type containing oil or liquid fat disclosed in the copending patent application of James P. Cox and Robert W. Duffy Cox Ser. No. 662,331 now abandoned, entitled Air Scrubbing Process, Apparatus and Scrubbing Liquid.

The nozzles 14 may spray the scrubbing liquid through apertures 20' in a false bottom 20 of the scrubbing chamber into the path air travels through each scrubbing chamber unit as shown in FIG. 2. Drain apertures 20", in addition to apertures 20' through which the nozzles spray, may be provided at the lower end of each false bottom passage so that scrubbing liquid can drain through the nozzle apertures and the drain apertures onto the bottom 21 of the scrubbing chamber for discharge through drain pipe 22 to header 23. From such header, the used scrubbing liquid passes through return pipe 24 to the reconditioner or spent liquid collector 25.

It is important that the polluted air be treated thoroughly by intimate contact with the scrubbing liquid while minimizing the resistance of airflow through the scrubber and expediting such flow of air. With the apparatus shown in FIGS. 1 to 4 the intimate contact between the scrubbing liquid and the air is effected by supplying atomized scrubbing liquid to the airflow at a number of locations along the airflow path. If the air flowed in a straight line it would soon become saturated with atomized scrubbing liquid and the scrubbing liquid in turn would be relatively ineffective to adsorb additional pollutant from the air. Consequently, it is desirable repeatedly to supply scrubbing liquid to the airflow, remove scrubbing liquid from the airflow, supply fresh scrubbing liquid to the airflow and remove such scrubbing liquid from the airflow to accomplish the most effective pollutant purging action.

Periodic removal of scrubbing liquid from the airflow along the airflow path can be effected by inertia. Thus, as shown in FIG. 3, the airflow path through each scrubber unit 1 is of serpentine configuration requiring that the airflow turn through a return bent path between adjacent linear channels formed between the baffles or partitions. During such passage from one channel to the next the inertia of the atomized scrubbing liquid carried by the air will tend to cause scrubbing liquid to strike the end of the transition passage between two parallel legs of the serpentine path so that, because of such abrupt change of airflow course and/or impact, scrubbing liquid will be precipitated from the airflow to run down the false bottom 20 and pass through the apertures 20' and 20" onto the bottom 21 to flow to the collector 25.

The scrubbing liquid may either be reconditioned for reuse in the scrubber or may be removed from the reservoir and transported to a different location to be reconditioned for use as reconstituted scrubbing liquid which will be supplied periodically to the reservoir 19.

Where light or ultraviolet treatment of the air being purified or of the scrubbing liquid is not particularly beneficial, a simplified type of scrubber such as shown in FIGS. 5 and 6 can be employed. The scrubbing container has an upright wall 30, which can be cylindrical, a top 31 and a bottom 32. Polluted air to be purified is supplied to the scrubbing container by an inlet duct 33 connected near the top of the wall 30. From the interior of the scrubbing chamber purified air is discharged through an upright discharge duct 34 extending through the top 31 of the scrubbing chamber, preferably located at about the center of the chamber. Such discharge duct extends downward through the chamber so that its lower end 35 is located near the bottom of the chamber to provide a rather long passage for air to be purified from the inlet duct near the top of the chamber down to the lower end 35 of the discharge duct.

Scrubbing liquid is discharged generally horizontally into the scrubbing chamber 30, preferably toward the air inlet duct 33, by nozzles 36 connected to a header 37. Such header is supplied with scrubbing liquid by the supply pipe 38 fed by pump 39 from the intake pipe 40. The nozzles 36 atomize the scrubbing liquid so as to promote intimate contact between the scrubbing liquid and the polluted air entering the inlet duct 33. In order to pass out through the discharge duct 34, it is necessary for the air to descend in the scrubbing container from the elevation of the inlet duct to the bottom of the outlet duct. As the air flows from the container into the lower end of the outlet duct, its direction of movement is reversed abruptly in a substantially return bent path. During such reversal of airflow direction, scrubbing liquid will be precipitated from the air and deposited in the body of scrubbing liquid 41 in the bottom of the scrubbing chamber because of the inertia and momentum of such scrubbing liquid carried by the air.

In order to recondition the scrubbing liquid in the body of liquid 41, liquid flows into an adjoining reservoir 42 through a connecting conduit 43 near the bottom 32 of the scrubber. Impurities carried by the scrubbing liquid may settle in the reservoir 42 and scrubbing liquid partially purged from impurities can flow through a further connecting conduit 44 near the top of the reservoir 42 into a scrubbing liquid purification chamber 45. The lower portion of such purification chamber may contain acid, such as sulfuric acid, on the surface of which the scrubbing liquid oil will float. The acid in such purification chamber can be heated by a heat source 47, such as a gas burner, located below the purification chamber to cause the acid to boil and mingle with the scrubbing oil 48 above it to strip further impurities from the scrubbing liquid. The intake pipe 40 through which scrubbing liquid is drawn to be dispensed into the scrubbing chamber dips into the body 48 of scrubbing liquid in the upper portion of the purification chamber.

The scrubber of FIG. 6 operates in the same general manner as the scrubber described in connection with FIG. 5. The only difference between the operation of the scrubber shown in FIG. 5 and that of FIG. 6 is in the procedure for reconditioning the scrubbing liquid. The reconditioning operation provided in the scrubber of FIG. 6 is adapted more particularly for scrubbers used for removing styrene or other materials from air that can be converted into polystyrene resin by ultraviolet light, which resin will settle out of the scrubbing liquid.

As reconditioned scrubbing liquid is drawn out of the reservoir 42 by pump 39 through the inlet pipe 40, the level of the liquid in the reservoir will tend to be lowered so that the liquid in the reservoir will be replenished by flow of scrubbing liquid from the body of liquid 41 through the connecting conduit 43. The scrubbing liquid in the reservoir 42 is reconditioned by being irradiated with ultraviolet light from the ultraviolet light source 49 mounted in the upper portion of the reservoir 42 above the surface of the liquid in such reservoir. The polystyrene resin formed from the styrene carried by the polluted air will settle gradually to the bottom of the reservoir 42 and can be removed periodically or continuously from the reservoir.

The scrubbing apparatus shown in FIGS. 7 to 10, inclusive, does not provide for reconditioning of the scrubbing liquid. This scrubber includes a tower 50, preferably of circular cross section, arranged with its axis or length upright. The diameter of the tower could be about 2.5 feet (0.76 meter). The tower may be from 11 feet (3.3 meters) to 13 feet (3.9 meters) in height. Polluted air to be purified by scrubbing is supplied to the base 51 of the scrubbing tower through an inlet conduit 52. After purification, the air is discharged through a stack 53 at the upper end of the tower.

Air to be scrubbed is moved upward through such tower by rotation of a bladed fan or propeller 54 mounted in the lower portion of the tower to rotate about a vertical axis. As shown in FIG. 10, the diameter of the propeller is nearly as great as the internal diameter of the scrubbing tower 50. The propeller should have four to eight blades, preferably six blades. The propeller is rotated at high speed, such as 2,000 rpm, by a motor 55 connected to the propeller hub pulley by a belt drive.

Scrubbing liquid is supplied to the scrubbing tower through a pipe 56 extending through the wall of the tower and terminating in a nozzle 57 having a large orifice and directed toward the root portions of blades of the propeller 54 moving toward the nozzle. The high speed impact of the propeller blades against the stream of scrubbing liquid discharged by the nozzle 57 and the centrifugal action of the rotating propeller blades atomize the scrubbing liquid and simultaneously mix it intimately with the polluted air impelled by the propeller upward through the scrubbing tower. The resulting intimate contact between the polluted air and the scrubbing liquid mist enables the scrubbing liquid to strip pollutants from the air during its travel upward through the scrubbing tower.

Thus, the propeller 54 effects the dual function of moving the polluted air upward through the scrubbing tower 50 and atomizing the scrubbing liquid projected onto the propeller blades. The propeller blades should therefore be designed to accomplish both of these functions effectively. Because of its dual purpose, it may be desirable for alternate blades to be of different design. Thus, the six-bladed propeller shown in FIG. 7 could include three blades having little or no pitch and the alternate blades having pitch or greater pitch for the purpose of moving the polluted air upward through the tower. A modified propeller could have eight blades in which alternate pairs of opposite blades would have little or no pitch and the other alternate pairs of blades would have pitch or greater pitch. By having alternate blades will little or no pitch, the speed of rotation of the propeller could be increased to atomized the scrubbing liquid more effectively without driving the polluted air upward through the scrubbing tower too rapidly.

An expanded chamber 58 is mounted on the upper end portion of the scrubbing tower with its lower portion elevationally overlapping the upper portion of the scrubbing tower to form the upper end of the tower as an annular flange 59 spaced from the wall of the expanded chamber to form an annular scrubbing liquid reservoir trough 60 between such flange and the wall of the expanded section 58. Scrubbing liquid that collects in such trough will drain through an upright return pipe 61 extending downward alongside the scrubbing tower and through the wall of the tower lower portion.

A nozzle 62 is mounted on the lower end of the pipe 61 within the scrubbing tower 50, preferably directed at the interior surface of the scrubbing tower wall. The volume of scrubbing liquid flowing downward from the trough 60 through the pipe 61 can be determined by the size of such pipe and the size of opening of the nozzle 62. The flow through pipe 61 can be regulated, if desired, by including an adjustable metering valve in such pipe. At least most of the scrubbing liquid discharged by nozzle 62 can be entrained by air flowing upward through the scrubbing tower sweeping the wall of the tower against which the scrubbing liquid discharged from nozzle 62 impinges. Also, such impingement will atomize the scrubbing liquid to a considerable extent to facilitate its entrainment by the polluted air.

While some of the scrubbing liquid will be precipitated from the polluted air during its passage upward through the scrubbing tower 50 and deposited in the well 51, the major portion of the scrubbing liquid will be entrained in the air emerging from the upper end of the scrubbing tower 50 into the expanded chamber 58. Such airflow will be spread away from the horizontal central portion of the scrubbing tower by the diverting action of a conical baffle 63 supported by an arm 64 projecting radially inward from an upward extension 65 of the expanded chamber 58 which is of reduced size. The conical baffle is supported for elevational adjustment relative to its supporting arm 64 by a threaded rod 66 screwed into a sleeve carried by the radially inner end of such arm. By turning the conical baffle 63 in one direction or the other, its elevation relative to the upper edge of flange 59 can be regulated which simultaneously will adjust the spacing between the base of cone 63 and the top of the expanded chamber 58.

The radial spacing between the base of the conical baffle 63 and the wall of the expanded chamber 58 and the elevational spacing between the base of the cone and the top of the expanded section forms a venturi passage 67, shown best in FIG. 9, through which the air must pass around the cone to the upper chamber 68 through the reduced central passage 65. As the air moves through such venturi passage its velocity will be increased and its pressure reduced, which induces impact of scrubbing liquid against the inner side of wall 58 and precipitation of such scrubbing liquid from the air into the collecting trough 60. To promote further precipitation of scrubbing liquid from the air flowing through the venturi passage 67, curved vanes 69 can be provided around the base of the cone 63 to induce swirling of the air passing them for producing a centrifugal force tending to fling particles of scrubbing liquid outward to impinge against and run down the inner wall of the expanded chamber 58 into the collecting trough 60.

The wall of the discharge passage 65 from the expanded chamber 58 projects upward above the bottom of the upper chamber 68 and is spaced inward from the wall of such chamber to form an upper scrubbing liquid collecting trough 70. Liquid can drain from that trough downward into the expanded chamber 58 through a drain pipe 71.

Corresponding to the construction described above in connection with the expanded chamber 58, a conical baffle 72 is located in the upper chamber 68 of the scrubbing tower arranged centrally over the connecting passage 65 between the expanded chamber 58 and the upper chamber 68. The base of such cone should be at least approximately as wide as the passage 65. Such cone is supported by an arm 73 extending radially inward from the wall of the upper chamber 68 or mounted in cantilever fashion on the top of such chamber. The cone is suspended from a sleeve on the inner end of the arm by a threaded rod 74 so that the cone can be rotated to alter its elevation relative to the arm 73 and, consequently, to vary the spacing between the base of the cone and the top of the upper section 68. Such adjustment will alter the size of the venturi passage 75 between the base of the cone and the top of the upper chamber.

The speed of airflow from the upper chamber 68 upward to the stack 53 extending upward from such upper chamber will be increased as the air flows through the venturi passage 75 and the pressure of the air will be correspondingly reduced. Such increase in speed and reduction of pressure will cause more scrubbing liquid to be precipitated from the airflow into the collecting trough 70. Precipitation of scrubbing liquid can be increased by providing curved vanes 76 around the base of the cone 72 which will cause the air to swirl as it passes through the venturi passage 75 and fling particles of scrubbing liquid outward against the wall of the upper chamber 68 to run down the inner side of such wall into the collecting trough 70.

Polluted air drawn into the scrubbing tower by the propeller 54 through the inlet 52 will be laden with atomized scrubbing liquid supplied by the nozzles 57 and 62 to strip pollutants from such air. As the air passes through the venturi passage 67 in the upper portion of the expanded section 58 and is simultaneously swirled, a large part of the scrubbing liquid will be precipitated from the air stream into the collecting trough 60. During upward progress of the air stream through the upper chamber 68 and through the venturi passage 75 while being swirled by the vanes 76 on the upper cone baffle 72, substantially all of the remaining scrubbing liquid carried by the air stream will be precipitated from it.

Scrubbing liquid precipitated from the airflow in the upper chamber 68 and collected in the collecting trough 70 will drain through the drain pipe 71 into the lower collecting trough 60. From such lower trough, scrubbing liquid will be recirculated through the pipe 61 and nozzle 62 discharging into the lower portion of the scrubbing tower.

Scrubbing liquid which is precipitated from the airflow during its passage upward through the scrubbing tower 50 will be deposited in the well 51 of the scrubbing tower and periodically removed or continuously drained and discarded. Such discarded scrubbing liquid will be replenished by the scrubbing liquid supplied through pipe 56 to nozzle 57.

Figure 11:
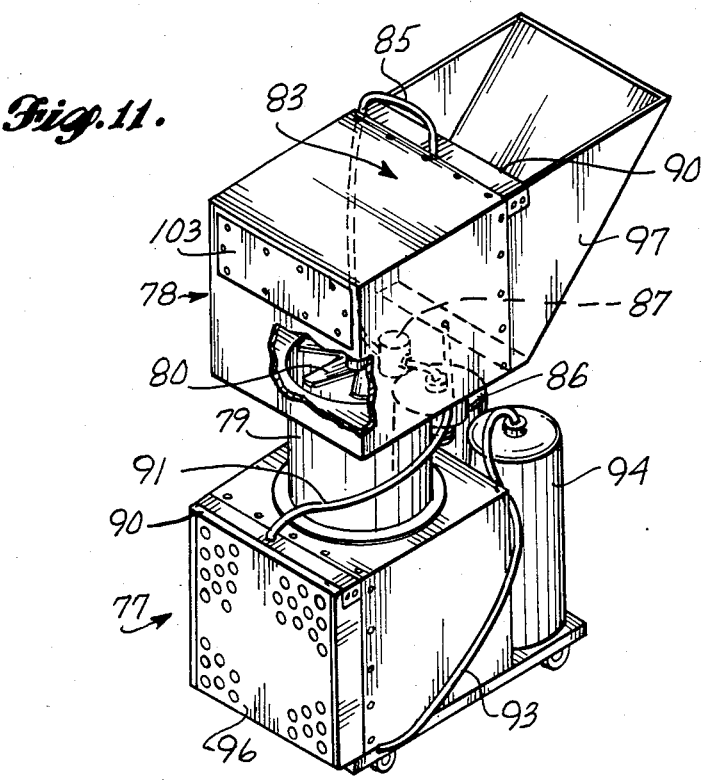
FIG. 11 is a top perspective of a mobile scrubber.
Figure 12:
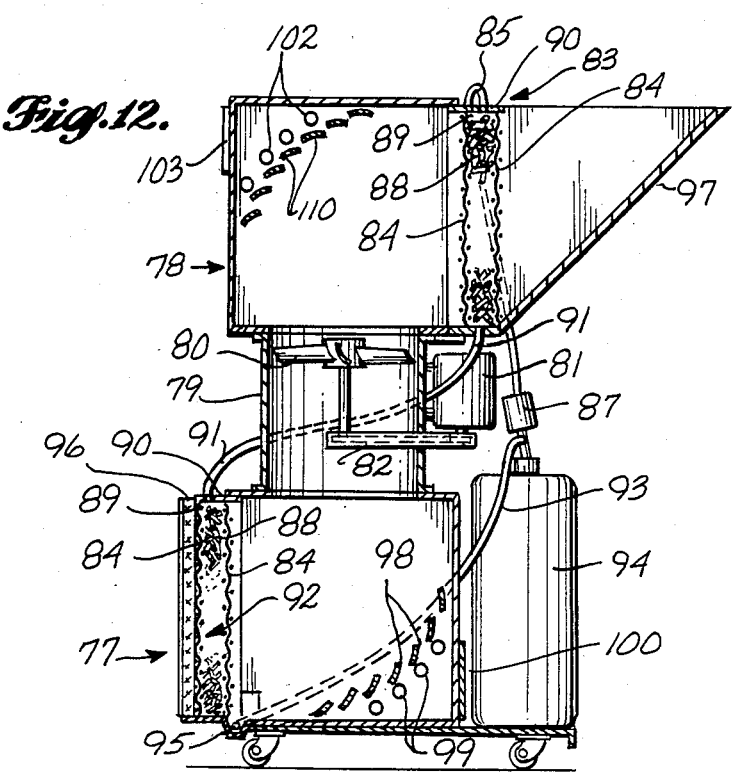
FIG. 12 is a vertical section through such scrubber.

FIGS. 11 and 12 show a mobile scrubber unit that could be placed anywhere in a building for removing pollutant such as styrene, for example, from air in the building or from a room in the building. The unit is self-contained and mounted on casters so that it can be moved easily from place to place.

The mobile unit shown in FIGS. 11 and 12 includes a lower polluted air intake section 77 and an upper purified air discharge section 78. The upper discharge section is connected to and supported on the intake section by an intermediate section 79 which may be of cylindrical shape with its axis upright. Such unit can be fabricated from sheet metal or sheet plastic material. Air is propelled through the unit at a rate of 1,000 cubic feet per minute to 2,000 cubic feet per minute by a fan 80 located in the intermediate section 79 which is driven by an electric motor 81 through drive belts 82 at a speed of 2,000 to 3,000 rpm, preferably 2,200 rpm.

The purification of the air passed through the unit is accomplished by intimate contact of such air with scrubbing liquid. Such liquid is supplied first to an upper scrubbing liquid contact component 83. The air passes through parallel screens or perforated walls 84 spaced apart in the direction of airflow through the scrubbing liquid contact component. Scrubbing liquid is supplied to such component by a supply tube 85 from a scrubbing liquid reservoir 86 by a pump 87 which meters the flow of scrubbing liquid in accordance with the purification requirements. The scrubbing liquid is sprayed onto scrubbing liquid carrier pieces 88 by a spray head 89 lodged in the upper portion of the scrubbing liquid contact chamber. Such carrier pieces are confined in the chamber formed between the parallel screens or perforated walls 84. The upper portion of such chamber is closed by a lid strip 90.

Scrubbing liquid which is discharged onto the carrier pieces 88 gradually percolates or seeps down through the mass of carrier pieces to the bottom of the contact chamber and is discharged from such chamber through the drain conduit 91. From this drain conduit, the scrubbing liquid is supplied to the scrubbing liquid contact chamber 92 of the lower air intake section. The lower scrubbing liquid component is of the same construction as the upper scrubbing liquid contact component including the apertured surfaces 84, spaced apart to form a contact chamber between them for receiving the scrubbing liquid carrier pieces 88. Scrubbing liquid draining through the conduit 91 from the upper section is discharged into the scrubbing liquid contact chamber of the lower section through a spray head 89. The scrubbing liquid thus discharged into the lower contact component will seep down through the mass of carrier pieces 88 and will be pumped through the discharge conduit 93 into a receiving tank 94 by a pump 95. Such spent scrubbing liquid can simply be discarded.

Because it is desirable for the scrubbing liquid to seep downward through the mass of carrier pieces, the flow of air through the contact chamber should be substantially horizontal with the mass of scrubbing liquid carrier pieces being in a substantially vertical chamber to enable scrubbing liquid to percolate down through it. With the arrangement shown, the air to be purified will pass successively through the lower and upper scrubbing chambers, arranged so that the air will first pass through the lower scrubbing liquid contact chamber containing partially-used scrubbing liquid and then through the upper contact chamber supplied with new or reconditioned scrubbing liquid.

While the two scrubbing liquid contact chambers could be arranged in succession in substantially horizontal registration, disposition of the contact chambers one generally above the other provides a much more compact arrangement and enables scrubbing liquid to drain by gravity from the upper contact chamber to the lower contact chamber.

In order to increase the effectiveness of the scrubbing liquid to purify the air, it is desirable to provide a conventional air filter pad 96 over the entrance to the unit, which filter is similar to that used in furnaces and air-conditioning systems.

To minimize drafts in the room in which the mobile air purifier is located, a baffle or deflector plate 97 is placed over the outlet of the unit that will deflect upwardly the current of air discharged from the unit. While the air could simply be discharged upwardly from the connecting section 79, such construction would allow for only one scrubbing contact chamber, namely the lower one.

The air to be purified which has passed through the lower contact chamber 92 will be deflected upward to the upper section by a wall or louvers 98, arranged to divert air from a horizontal path to an upward path. A deflector formed of louvers is preferred so that ultraviolet lights 99, located behind the deflector, can irradiate the air passing the set of louvers to polymerize styrene carried by such air, or by atomized scrubbing liquid suspended in the air, from styrene to polystyrene resin. Most of such atomized scrubbing liquid carried by the air will be filtered out of it in the upper scrubbing liquid contact chamber 83. Access to the ultraviolet lights 99 in the lower section of the unit is afforded through an opening closed by cover 100.

Air being purified which is propelled upward through the connecting section 79 is deflected to horizontal flow for passage through the contact chamber 83 in the upper section by a curved deflecting wall or set of louvers 101. Such louvers will enable ultraviolet light from upper ultraviolet light generators 102 to irradiate the air being purified further, additionally to promote polymerization into polystyrene resin of styrene carried by the air or by scrubbing liquid suspended in the air. Access to the ultraviolet lights 102 can be provided through an aperture in the upper section 78 of the air-purifying unit which is closed by a cover 103.

Figure 13:
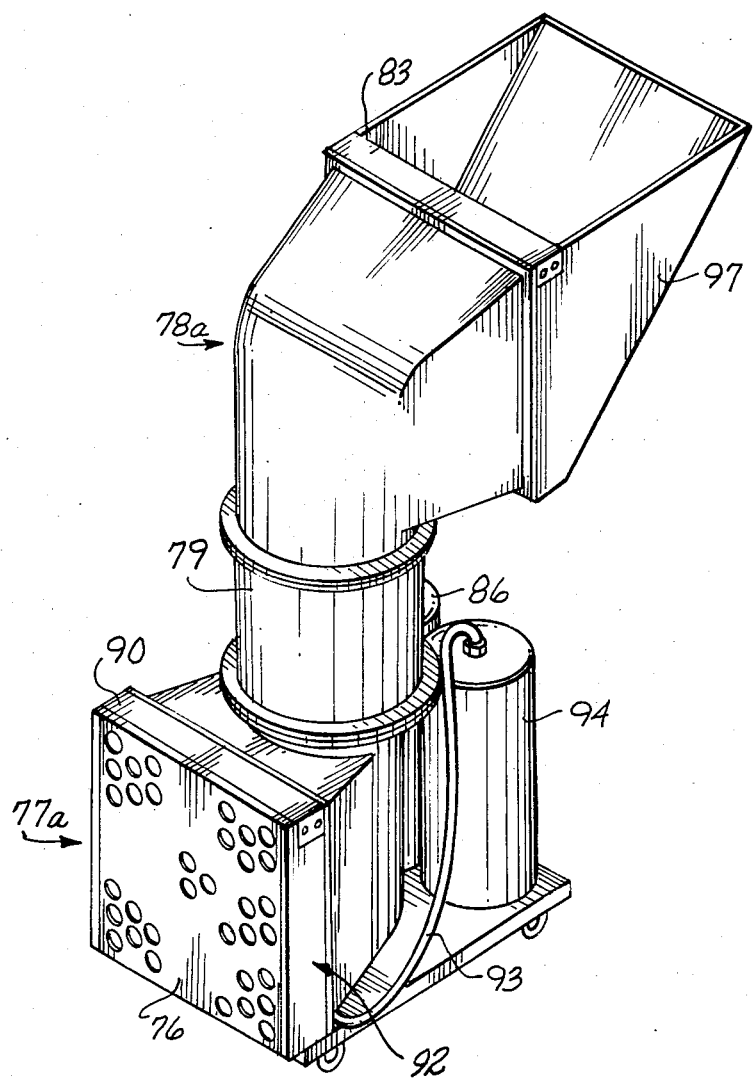
FIG. 13 is a top perspective of a modified scrubber generally of the type shown in FIGS. 11 and 12.

The scrubbing unit shown in FIG. 13 is generally similar to that shown in FIGS. 11 and 12 and can be supported on casters, if desired, to make it mobile. In this instance, the lower section 77a includes the scrubbing liquid contact component 92. The walls of the lower section casing behind such unit converge to a curved wall having a radius of curvature substantially equal to the radius of curvature of the cylindrical intermediate connecting section 79. An upper section 78a is connected to such connecting section by a circular end having a radius substantially equal to the radius of the intermediate section. Such upper section has a scrubbing liquid contact component 83 of the type described in connection with FIGS. 11 and 12 and a deflector or baffle 97. The remaining features of the unit shown in FIG. 13 are similar to those described in connection with the unit shown in FIGS. 11 and 12, except that this unit does not have ultraviolet light irradiation units. Such unit can be made of molded plastic, such as polystyrene or polyethylene, or of formed fiberglass-reinforced resin.

FIGS. 14 and 15 show a wall-mounted scrubber having a lower section 77b and an upper section 78b, which sections are generally similar to the sections 77 and 78, respectively, shown in FIGS. 11 and 12. In this instance, however, the lower and upper sections are connected by an intermediate connecting section 79a which can be fitted between studs of a wall and covered by the wall facing 104.

Scrubbing liquid is supplied to the upper scrubbing liquid contact chamber 83 by a supply conduit 85a, conveying scrubbing liquid from a reservoir or storage container 86a by a pump 87. Scrubbing liquid which percolates through the upper scrubbing liquid contact chamber 83 is conveyed to the lower scrubbing liquid contact chamber 92 through a tube 91a. Spent scrubbing liquid which percolates through the scrubbing liquid contact chamber 92 will be discarded through a drain conduit 93a.

Air is impelled through the unit shown in FIGS. 14 and 15 by a propeller 80a located behind the lower scrubbing liquid contact chamber 92 and driven by a motor 81a mounted on the rear wall of the unit. The air and atomized scrubbing liquid carried by it can be irradiated during its passage upward through the connecting section 79a by ultraviolet lights 99a located at intervals along such connecting section.

FIG. 16 shows details of the scrubbing liquid component 83 of the upper section of the scrubbers shown in FIGS. 11 and 12, FIG. 13 and FIGS. 14 and 15. The scrubbing liquid contact chamber is shown as being formed between the apertured sheets 84, which chamber is filled with the scrubbing liquid carrier pieces 88. The spray head 89, which in assembled condition is lodged in the upper portion of the scrubbing liquid contact chamber, is supplied with scrubbing liquid flowing through the supply tube 85 extending upward through the cover 90. The drain hole 91' communicates with the drain tube 91 or 91a.

FIG. 17 shows the lower scrubbing liquid contact component 92, having a construction similar to that of the upper scrubbing liquid contact chamber 83 and which, in addition, has the filter 96 for covering the intake side of the scrubbing liquid contact chamber 92.

FIGS. 18 and 19 show in greater detail the construction of the spray head 89. The scrubbing liquid supply conduit 85 is connected to the central portion of a core tube 105 having discharge apertures 106 spaced along its length. A sleeve 107 closely embraces the core pipe 105 at the location of each aperture 106. Such sleeve has in it a circumferential slit 108, forming an arc of 20 degrees to 60 degrees, located in registration with an aperture 106 so that scrubbing liquid will be ejected from the core tube 105 in a spray instead of in a stream. Such sprays will distribute the scrubbing liquid onto the carrier pieces 58 in the contact chamber.

While the scrubbing liquid carrier pieces 88 can be of different shapes, a suitable type of piece for this purpose is one having large surface area and which will be virtually nonabsorbent. The pieces 88 shown in FIG. 20 are shotgun shell wadding pieces, made of plastic or hard-surfaced cardboard sheet material.

Figure 21:
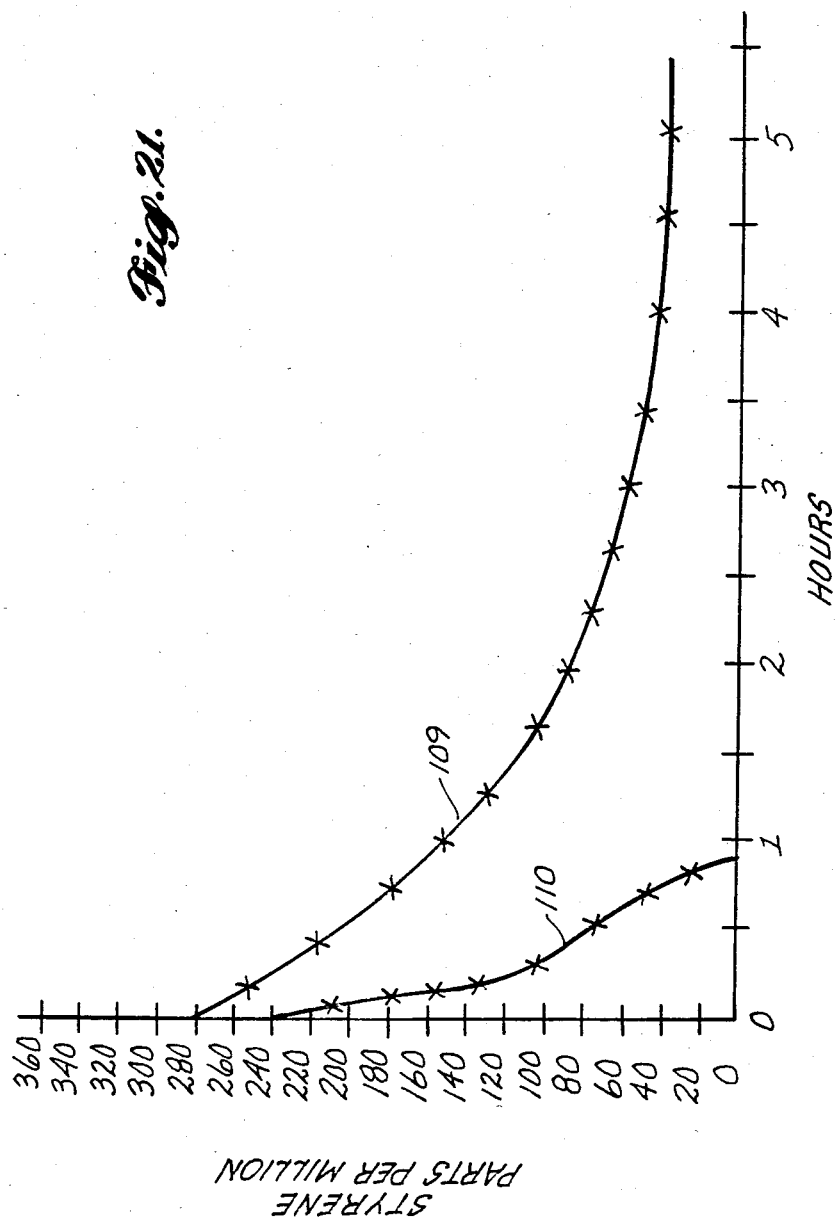
FIG. 21 is a graph representing the performance of scrubbers of the type shown in FIGS. 11 and 12.

The effectiveness of the devices shown in FIGS. 11 and 12 for removing styrene from air in a room by circulating the air through such units is shown by the graphs in FIG. 21. The curve 109 illustrates the dissipation of styrene by natural air circulation. If the air in a large room, such as 4,000 cubic feet, has 240 to 250 parts per million of styrene, such concentration will deteriorate gradually over a period of several hours, such as four hours, to a minimum value of 40 to 60 parts per million because styrene is heavier than air.

Figure 22:
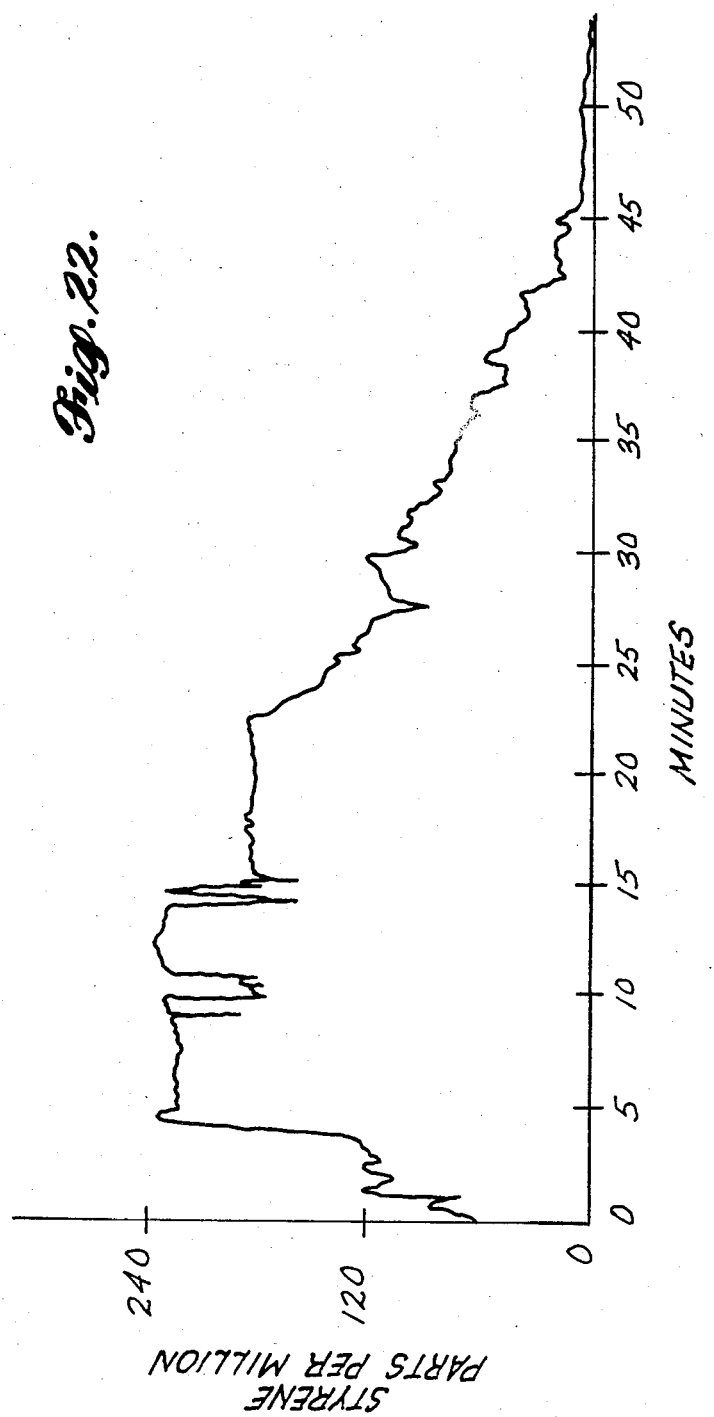
FIG. 22 is another graph representing performance of such scrubbers.

On the other hand, the devices of FIGS. 11 and 12 reduce the styrene content of the air quicker and more effectively. Curve 110 shows the styrene content being reduced from 240 parts per million to substantially zero in less than one hour. FIG. 22 shows a graph 111 of an actual test. A scanning infrared analyzer was energized at the 5 minute graduation and the scrubber was energized at the 15 minute graduation. The styrene content dropped precipitously to approximately 180 parts per million and then decreased progressively down to a small amount in a period of 30 minutes.

For some applications, it may be desirable for the scrubber to be even more effective and efficient than illustrated by the curves of FIGS. 21 and 22. For such purpose, the scrubbing liquid and the polluted air can be mixed more thoroughly so that the scrubbing liquid enters into more intimate contact with the pollutant carried by the air. Such more intimate contact is effected by incorporating in the scrubbers of the type described above dynamic turbulent mixers or agitators, such as shown in FIGS. 23 to 52.

A scrubber of the type shown in FIGS. 1 to 4, for example, is shown in FIG. 23 equipped with dynamic turbulent mixers or agitators of the type shown in FIGS. 24, 25 and 26. Since the function of these mixers or agitators simply enhances the scrubbing action of the scrubber described in connection with FIGS. 1 to 4, inclusive, reference is made to the description of those figures with respect to the general construction of the scrubber shown in FIG. 23. The scrubber of this figure is modified from the scrubber of FIGS. 1 to 4, inclusive, by extending the intake duct 2 into the scrubbing chamber 1 by the extension 112 connected to the duct 2 by an elbow 113. Scrubbing liquid is supplied to such elbow by a branch tube 114 connected to a scrubbing liquid supply header 115 suitably connected to the scrubbing liquid supply pipe 17 shown in FIG. 1.

The dynamic turbulent mixer or agitator 116 is mounted in the end of the extension pipe 112, as shown best in FIGS. 23, 24 and 25. Such mixer includes hard sheet means in the form of a strip or bar 117 of hard material, such as metal or plastic, extending edgewise diametrically across the end of the tube 112 parallel to the direction of gas flow through the tube. Such strip has a length extending transversely of the direction of gas flow 10 to 15 times as great as its width parallel to the direction of gas flow, such length preferably being about 12 times as great as such width, and a width 3 to 8 times, preferably about 5 times, as great as its thickness.

Along one side, and preferably along both sides, of such hard strip extend vibratory flexible resilient sheet means formed by side strips 118 of elastomer material, such as plastic or rubber, in closely adjacent, side-by-side relationship. Such sheet means are disposed substantially parallel to each other and to the gas flow path through the extension stretched to a greater or lesser extent and are either in contact with the opposite sides of the hard strip 117, respectively, or are located closely adjacent to the opposite sides of the hard strip. For ease of mounting the strips 117 and 118 diametrically across the tube 112, it is preferable for such tube to be made in two halves secured together by suitable joints at opposite sides of the tube. The hard strip 117 and the flexible strips 118 can be held in assembled relationship, preferably with the flexible strips stretched at least to some extent, by bolts 119 extending through opposite ends of the strips and the joint flanges of the tube 112, as shown in FIGS. 24 and 25.

The structure of the dynamic turbulent mixer or agitator 116 shown in FIG. 24 can be modified by making the side strips 118 of hard flexible material, such as resilient metal, or there might be only one diametral flexible strip and one hard strip, two flexible strips and one hard strip as shown, or one hard strip and more than two flexible strips. Also, the width and thickness of the various strips need not be equal. The important consideration is that the strips will be activated or excited by the airflow passing them at such a speed that the strips will trill or vibrate vigorously, such as in resonance, to flail the polluted air and scrubbing liquid carried by it. If a combination of one or more flexible strips and a hard strip is used, the flexible strips in vibrating will slap against the hard strip to increase the vibration frequency. Such flailing action of the strips will produce turbulence in the flow of gas past the strips so as to enhance the intimacy of mixing of the scrubbing liquid with pollutant carried by the air, and thus increase the efficiency of the scrubbing liquid in sequestering pollutant.

In the structure of FIG. 27, the extension or airflow conduit 112a has been constricted, as formed by the extension 112 shown in FIG. 24. In this instance, the width of the passage perpendicular to the dynamic turbulent mixer 116 has been reduced so as to provide a passage of double convex cross section. A passage of this shape confines the gas flow much more closely to the dynamic agitator or turbulent mixer.

In the airflow conduit shown in FIGS. 28 and 29, the cylindrical supply pipe 112b merges into a nozzle 112c having an even narrower width in one direction than the width in the other direction perpendicular to it than the relative major and minor widths of the discharge end 112a of the conduit shown in FIG. 27. In the agitator of FIGS. 28 and 29, the major width is a plurality of times as great as the minor width, preferably about six times as great. In this instance, the opposite walls of the nozzle 112c are parallel for most of their lengths transversely of the direction of gas flow, and the corresponding end portions of such parallel nozzle walls are connected by arcs.

The minor width of the nozzle shown in FIGS. 28 and 29 is sufficiently small that a dynamic agitator or turbulent mixer in such nozzle can be formed by a single diametral flexible strip arranged parallel to the nozzle end walls and spanning the major width of the nozzle. While the strip 118a could be of metal or other hard material, it is preferable in this instance for it to be of elastomer material of medium hardness. The opposite ends of the strip can have cylindrical enlargements or beads to fit into corresponding sockets of the opposite ends of the major width of the nozzle to maintain the strip in generally planar condition when no gas is flowing through the nozzle. The length of the strip 118a in relaxed condition may be less than the major width of the nozzle so as to require that the strip be stretched to a greater or lesser extent to install it in the nozzle.

FIGS. 30 and 31 show alternate dynamic agitators or turbulent mixers of the general type shown in FIGS. 28 and 29 but which structure enables the stretch or tension of the vibratory strip to be altered. In this instance, the gas passage conduit 112d has opposite walls that are somewhat bellied instead of being precisely parallel like the walls of the nozzle 112c shown in FIGS. 28 and 29. The major width of the gas passage in this instance also is several times as great as the maximum minor width perpendicular to the major width as in the nozzle 112c shown in FIGS. 28 and 29. In this instance, however, at least one of the opposite ends of the flexible strip 118b, which may be either of elastomer material or of metal, is attached to the adjacent wall of the nozzle by an adjustable bolt fitting 119a including a hook hooked into an aperture in one end of the strip 118b, the shank of which hook is secured to a bolt extending through an aperture in the wall of the nozzle on which a nut is threaded bearing on the outer wall of the nozzle. Rotation of the nut on the bolt will move the bolt axially nonrotatively in one direction or the other to alter the position of the strip-engaging hook for increasing or decreasing the tension on the vibratory strip 118b. Such a strip anchor enables the stretch or tension of strip 118b to be altered readily so as to promote vibration or trilling of the strip by gas flows of different velocity passing the strip.

A dynamic turbulent mixer of a type suitable for use in the scrubber of FIGS. 7 to 10 is shown in FIGS. 32 to 34. One or more clusters 120 of such mixers may be mounted on baffle plates 121 in the tower 50 in the manner shown in FIG. 44. The mixers 122 can be arranged on the plates 121 to provide different flow patterns which collectively produce a very turbulent aggregate flow to enhance mixing of the scrubbing liquid and pollutant carried by the air.

The construction of the individual mixing or agitating units is shown in FIGS. 32 to 34. Each mixing or agitating unit 122 is mounted on the baffle plate 121 by a mount 123 having a base planar flange 124 and an upstanding flange 125 projecting from the base flange and of a shape to form an aperture or passage of double-convex or convexo-convex cross section. A boot 126 of soft, flexible, resilient elastomer material is mounted on such mount to produce the agitation mixing action. The skirt 127 of such boot is of convexo-convex shape complemental to the upstanding flange 125 of the mount so that such skirt will fit snugly over the mount flange, as shown best in FIG. 34. Such skirt is joined to a flattened free end portion 128 by a transition section 129. The flattened free end portion 128 is formed as contiguous or closely spaced resilient sheet members disposed parallel and adjacent to each other and parallel to the direction of gas flow through the boot in the form of substantially planar or linear flaps forming a narrow slit between them.

Figures 44, 45:
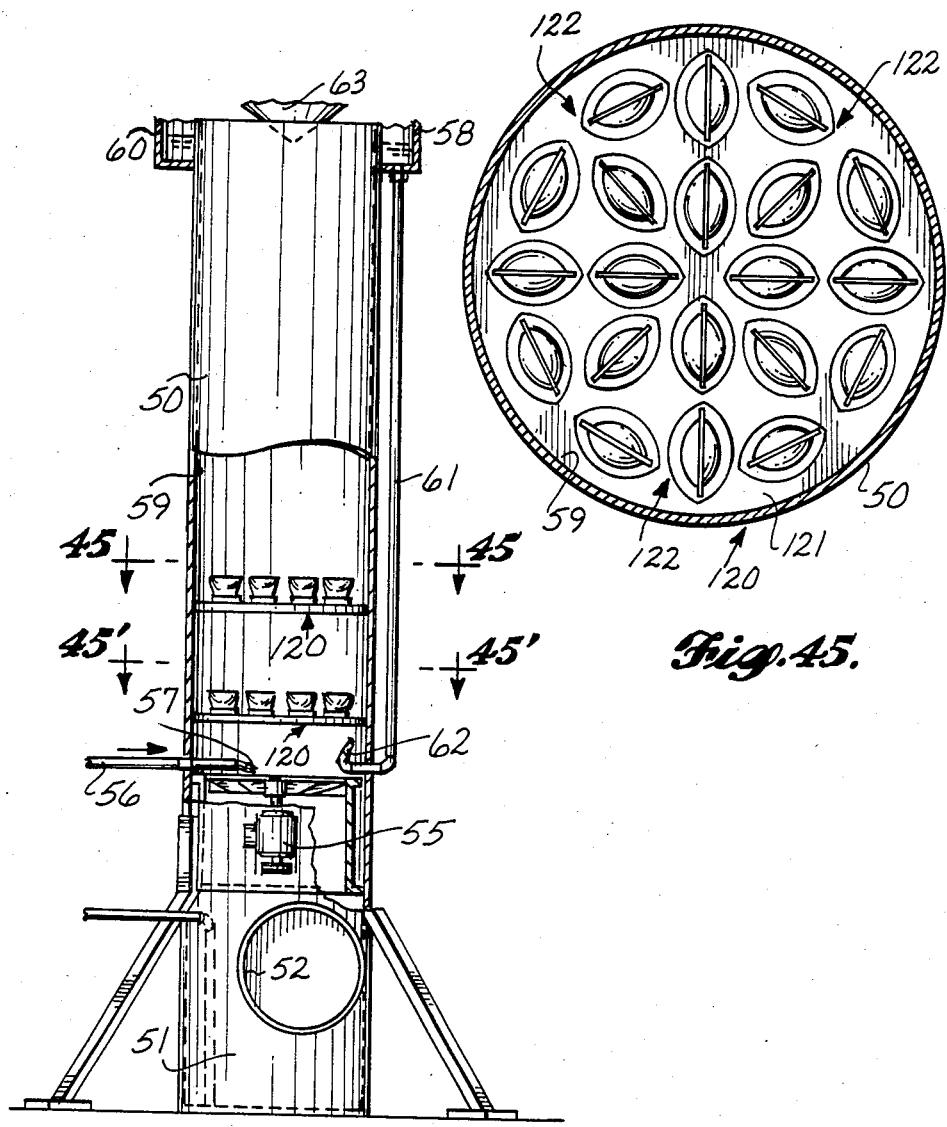
FIG. 44 is a side elevation of a portion of a scrubber similar to FIG. 9 but incorporating dynamic agitators or turbulent mixers.
FIG. 45 is a transverse section through the scrubber of FIG. 44 taken on line 45—45 or line 45'—45' of FIG. 44.

The skirt 127 of the boot 126 is secured in place fitted over the upstanding flange 125 of the mount by a retaining band 130 overlying the skirt and secured to the mount flange by rivets 131. The base flange 124 of the mount is secured over an aperture in the baffle plate 121 on the downstream side by rivets 132. As shown in FIG. 45, the linear flaps 128 of the boots 122 can be oriented in radial positions, or in circumferential positions, or in any other arrangement which will provide adequate flow through the transverse plate 128 and promote mixing of the air passing through the various mixers. The pattern shown in FIG. 45 in which the mixers are arranged includes six central agitators or mixers all having their planar or linear flaps disposed radially encircled by twelve peripheral mixers including four mixers spaced apart 90 degrees having their flaps extending radially with two agitators or mixers disposed between adjacent orthogonal agitator mixers which have their linear flaps extending chordwise or generally circumferentially.

The mixers or agitators should be of a size and made of elastomer material having a thickness and resiliency such that, when air carrying scrubbing liquid and pollutant is blown through them, the boot flaps will trill or vibrate vigorously in a resonant manner slapping against each other so as to flail the air and enhance the contact of the atomized scrubbing liquid with pollutant carried by the air to promote sequestering or stripping of such pollutant from the air by the scrubbing liquid.

In FIG. 46 a scrubber of the type shown in FIGS. 11 and 12 is equipped with baffle plates 120 carrying dynamic turbulent mixers or agitators 122 of the type shown in FIGS. 32 to 34 and described in connection with those figures. While a set of such mixers is shown both above and below the fan 80 at opposite ends of the intermediate scrubber section 79, operation of the scrubber shown in FIGS. 11 and 12 would be improved if only one of such dynamic turbulent mixer baffles were used. Such mixers or agitators function in this scrubber in the manner described above with reference to FIGS. 44 and 45.

FIG. 47 shows a scrubber of the general type illustrated in FIGS. 14 and 15 equipped with dynamic agitators or turbulent mixers. To facilitate such installation, it is preferred that the propeller 80b be mounted on an upright shaft and located in the riser section of the scrubber, instead of being in the horizontal inlet section of the scrubber as shown in FIG. 15. In this instance, the motor 81b which drives the propeller 80b is located below the intake section of the scrubber instead of behind that section. Two baffle plate agitator or mixer assemblies 120 are shown as located, respectively, above and below the propeller 80b. The mixers 122 will operate in this installation in the same manner as described in connection with FIGS. 44 and 45.

Instead of relying simply on the vibration and flailing of the flexible lips 128 of the boot shown in FIGS. 32 to 34 moving to the opposite sides of a center line as shown in broken lines in FIG. 33 for the agitation of the gas, the flexible lips or flaps can beat against a hard central sheet member analogous to the member 117 as described in connection with FIGS. 24, 25 and 26. In this instance, the hard plate 117a shown in FIG. 35 is inserted between the opposite lips or flaps 129. This hard inserted plate or strip may have the dual function of providing a striking surface for the lips or flaps 129 and, in addition, may be of a length sufficient when inserted into the discharge end of the boot to stretch the flaps 129 parallel to their lengths to a greater or lesser extent for stretching or tensioning the flaps and thereby placing them under stress to alter their frequency of vibration effected by the discharge of gas from the boot.

As shown in detail in FIG. 36, an anchoring point may project from each end of an insert bar or strip 117a that can be embedded in the elastomer material of the boot at opposite ends of the flaps 129 to deter movement of the bar 117a either farther into the boot discharge opening or out of such opening.

The vibration or trilling of the flaps 129 can be altered in frequency or amplitude for agitation effectiveness by modifying the structure of the bar inserted into the discharge opening of the boot. In FIG. 37, the bar 117b is shown as having slots cut in one edge, and the bar 117c shown in FIG. 8 has apertures extending through it.

The vibrating or trilling characteristics of the lips 128 of the boot 129 can be altered by changing the tension or stress to which the lips or flaps 128 are subjected. The stretching or tension of such flaps can be altered in various ways to tune the agitator to provide the performance desired. Controlled stretching of the flaps can be effected in different ways as illustrated by the constructions shown in FIGS. 39, 41, 42 and 43, for example.

In FIG. 39, a hard, rigid insert bar 117d has been inserted between the flaps 128 forming the discharge end of the boot 129. The position of one or both ends of the bar can be adjusted relative to the boot to alter the degree of stretching of the flaps 128 by mechanism such as shown best in FIG. 40. A shell 117e fitting slidably over the end of the bar can be moved relative to the bar end by rotation of a mounting screw 119b passing through the wall of the boot 129 threaded into a tapped hole in slide 117e and having its inner end bearing against the end of the spreader bar 117d. The farther the screw 119b is screwed inward, the more the composite structure of the bar 17d and slide 117e will be elongated to stretch and thus tension the flaps 128.

In FIG. 41, spreader hooks 119c extending along opposite edges of the boot 129, respectively, have the ends of their shanks mounted by a pivot 119d on the base 124 of the boot mounting and their hook ends hooked into the discharge slot of the boot. Adjusting bolts 119e screwed through tapped holes in the portions of the shanks of hooks 119 adjacent to pivots 119d and having ends bearing against the mounting for the pivot can be turned to swing either of the hooks 119c toward the other hook to reduce the stretching and tensile stress in the flaps 128 or away from the other hook to increase the stretching and tensile stress of the flaps.

In FIG. 42, stress-control rods 119f again have one end pivotally supported on the boot face mount flange 124 and have shank portions extending through the wall of the boot 119 and offset portions bearing against the interior of the boot wall at the ends of the discharge slot between the flaps 128. The stress-control rods can be urged to swing in a direction to stress the flaps by tension springs 119g connected between such rods and spring anchor lugs 119h mounted on the mount base flange. The degree of stress exerted by the rods on the boot can be altered by utilizing springs 119g of different strengths or the anchor lugs 119h can be made movable to enable the length of the springs 119g to be altered.

The structure shown in FIG. 43, enables a direct stretching pull to be exerted by a spring or springs 119h connected between a lug 119i on the discharge end of the boot and a spring anchor post 119j carried by the boot-mounting flange 124. Again, the amount of stress exerted on the boot flaps can be altered by utilizing springs 119h of different strengths, or the spring anchor post 119j can be altered toward or away from the boot flaps.

Modified types of dynamic turbulent mixers or agitators are shown in FIGS. 48 to 54 which can be used for mixing scrubbing liquid with polluted air as described above, or which can be used in other environments in which it is desired to promote mixing of gases or materials carried by gas, or in situations where it is merely desirable to agitate or produce turbulence in gas for any purpose, such as for a hair dryer nozzle. The important aspect is that the agitator creates turbulence in the gas whether or not the gas includes more than one component.

In the mixer or agitator shown in FIGS. 48 and 49, air is discharged from a pipe 133 on which the dynamic turbulent mixer or agitator boot 134 is mounted. The pipe 133 is shown as being of cylindrical shape, and the boot 134 has a cylindrical skirt 135 that fits snugly over the end of the pipe 133. The end portion 136 of the boot remote from the skirt 135 is flattened and is connected to the skirt portion by a transition section 137. The free end 138 of the boot remote from the skirt 135 forms adjacent, substantially parallel, linear or planar sheet lips or flaps 138 which, when no gas is flowing, are in contiguous engagement or which are at least closely spaced.

The boot 134 is made of thin, flexible, resilient material which preferably is an elastomer. When gas is blown from the pipe 133 through the boot 134 at a speed appropriate for the proportions and type of material of which the boot is made, the flaps 138 will vibrate vigorously, preferably in trilling or resonant fashion, and will agitate and produce turbulence in the gas flow discharged between the lips or flaps.

A more effective mixing action may be effected if a hard spreader or separator sheet or strip is inserted between the flaps 138 so as to stretch the flaps to some extent and provide a hard surface against which the flaps can slap. Such a spreader strip 139 is shown in FIG. 50. Such mixer or agitator will operate in a manner similar to that shown and described in connection with FIG. 35.

FIGS. 51 and 52 show a mixer or agitator of the type illustrated in FIGS. 48 and 49 modified by having the parallel adjacent resilient sheet members forming the flattened end portion 136 of the boot slit at 140 transversely of the gas flow through the boot to form opposing strips. Such slits may be spaced apart equally to form between them strips or bands of equal width, as shown in FIGS. 51 and 52, or the slits can be spaced apart different distances so that the resonant frequencies of vibration of the strips between them will be different. The strips or bands may have no separator between them, or a hard plate or strip corresponding to the strip 139 shown in FIG. 50 can be inserted between some or all of the bands both to separate the flexible bands and to stretch them.

In FIG. 53, slots 140a in the boot sidewalls or flaps 136 extend in parallel relationship transversely of the direction of flow of gas through the boot 134b. Such slots can be spaced apart equally or at different intervals, and the slots may be of the same width or of different widths depending on the action of the bands formed between them which is desired during flow of gas through the boot. Also, as discussed in connection with FIGS. 51 and 52, a hard separator plate or strip can be inserted between the opposite bands if desired.

In FIG. 54, the flattened end portion 136 of the boot is slit, but in this instance the slits 140b extend parallel to the flow of gas through the boot instead of transversely of such flow. The slits open at the free or gas discharge end of the boot so as to form fingers that can vibrate or flap and thus flail the air. Depending on the action desired, the spacing of the slits and the widths and lengths of the slits or slots can be varied, as well as the thickness and character of the material used for the boot.

While the dynamic agitators or turbulent mixers described above have been constructed principally of sheet elements, the flailing of the gas to produce vibration or mixing can be accomplished by agitators or mixers having other types of dynamic vibrating material or structures such as wires, rods, tubes or reeds supported either in cantilever fashion or by opposite ends and including any desired number and in a variety of different arrays. The important aspect is that the flailing elements move vigorously, preferably in resonance, to produce agitation in the gas flowing past the agitating elements. Such elements should be capable of being tuned so that their vibrations will most effectively produce the intimate mixing of the polluted gas and scrubbing medium.

Also, the agitators can either effect dynamic turbulent mixing of a scrubbing medium with polluted gas by creating a resonant zone through which the gas and scrubbing medium mixture passes, or the agitators can simply agitate the gas for the purpose of promoting coalescence and precipitation of pollutant particles, such as particles of polystyrene resin produced from styrene by ultra violet light irradiation or promotion of combustion by moving the agitated gas past heating elements, or the agitation of the gas can be used for other purposes such as for expediting the drying of hair or other articles.

We claim:

1. A process for scrubbing polluted gas which comprises providing a predetermined gas flow path having therein two closely-spaced, resilient vibratory sheet means disposed in generally parallel relationship and generally parallel to such gas flow path for forming a narrow slit between the sheet means, moving gas through such slit and thereby effecting vibration of the vibratory sheet means, and supplying scrubbing liquid to such polluted gas moving through such gas flow path.

2. The process defined in claim 1, including stretching the resilient vibratory sheet means in a direction transversely to the direction of gas flow.

3. The process defined in claim 1, including locating hard sheet means between the resilient vibratory sheet means against which the resilient vibratory sheet means slap.

4. Scrubbing apparatus for purifying gas comprising passage means for gas containing gaseous pollutant, including an inlet and an outlet, establishing a gas flow path for flow of polluted gas through liquid supply means for supplying scrubbing liquid to polluted gas flowing alongsuch path to be scrubbed by removal of gaseous pollutant from such polluted gas by such scrubbing liquid, and dynamic turbulent mixing means located in the gas flow path including resilient vibratory sheet means disposed substantially parallel to the direction of gas flow along the gas flow path for flailing the polluted gas and scrubbing liquid and thereby creating substantial turbulence in the polluted gas flow enchancing contact of the scrubbing liquid and and gaseous pollutant carried by the polluted gas.

5. The scrubbing apparatus defined in claim 4, in which the resilient viratory sheet means includes a strip of an extent transversely of the direction of gas flow a plurality of times as great as the extent of a strip parallel to the direction of gas flow.

6. Scrubbing apparatus for purifying gas comprising passage means, including an inlet through the apparatus from said inlet to said outlet, scrubbing liquid supply means for supplying scrubbing liquid to polluted gas to be scrubbed flowing along such path, a baffle plate disposed transversely of the gas flow path and having an aperture therethrough, and dynamic turbulent mixing means including a boot in registration with said baffle plate aperture and projecting beyond the downstream side of said baffle plate, said boot having two resilient sheet members disposed in substantially parallel adjacent relationship forming a gas discharge passage therebetween.

7. The scrubbng apparatus defined in claim 4, and hard sheet means located close alongside the resilient vibratory sheet means and disposed substantially parallel to the resilient vibratory sheet means to be struck by the resilient vibratory sheet means as it flails.

8. The scrubbing apparatus defined in claim 7, in which the resilient vibratory sheet means and the hard sheet means are strips having an extent transversely of the direction of gas flow a plurality of times as great as their extent parallel to the direction of gas flow.

9. The scrubbing apparatus defined in claim 4 in which the sheet means includes two resilient sheet members in generally parallel side-by-side relationship.

10. The scrubbing apparatus defined in claim 9, and hard separator sheet means located between the resilient sheet members and disposed substantially parallel to the resilient sheet members.

11. The scrubbing apparatus defined in claim 10, in which the hard separator sheet means are connected to the resilient sheet members for stretching the resilient sheet members.

12. The scrubbing apparatus defined in claim 4, including means independent of the gas flow for stretching the resilient vibratory sheet means transversely of the direction of gas flow.

13. The scrubbing apparatus defined in claim 12, and means for adjusting the degree to which the resilient vibratory sheet means are stretched.

14. The scrubbing apparatus defined in claim 6 in which the two resilient sheet members are substantially linear flaps.

15. The scrubbing apparatus defined in claim 14, and hard spacer sheet means interposed between the flaps.

16. The scrubbing apparatus defined in claim 6, in which the resilient sheet members have slits forming opposing strips.

17. The scrubbing apparatus defined in claim 16, in which the slits extend transversely of the direction of gas flow through the boot.

18. The scrubbing apparatus defined in claim 16, in which the slits extend substantially parallel to the direction of gas flow through the boot and open at the end of the boot from which gas is descharged.

19. Scrubbing apparatus for purifying gas comprising passing means, including an inlet and an outlet, establishing a gas flow path for flow of gas through the apparatus for said inlet to said outlet, scrubbing means for supplying scrubbing liquid to polluted gas to be scrubbed flowing along such path, and dynamic turbulent mixing means including resilient vibratory sheet means disposed in closely adjacent relationship and located in the gas flow path for creating substantial turbulence in the polluted gas flow by vibration of said sheet means and thereby enhancing contact of the scrubbing liquid and the pollutant carried by the polluted gas.

20. The apparatus defined in claim 19, and hard sheet means located close alongside the resilient vibratory sheet means and disposed substantially parallel to the resilient vibratory sheet means.

21. The apparatus defined in claim 20, in which the resilient vibratory sheet means and the hard sheet means are strips having an extent transversely of the direction of gas flow a plurality of times as great as their extent parallel to the direction of gas flow.

22. The scrubbing apparatus defined in claim 19, in which the resilient vibratory sheet means are disposed substantially parallel to the gas flow along the gas flow path for failing the polluted gas and scrubbing liquid.

23. The scrubbing apparatus defined in claim 22, and hard sheet means located close alongside the resilient vibratory sheet means and disposed substantially parallel to the resilient vibratory sheet means to be struck by the resilient vibratory sheet means as it flails.

24. The scrubbing apparatus defined in claim 23, and means for stretching the resilient vibratory sheet means.

25. The scrubbing apparatus defined in claim 24 and means for adjusting the degree of stretching of the resilient vibratory sheet means.

26. The scrubbing apparatus defined in claim 19, and means for tensioning the resilient vibratory sheet means in a direction transversely of the direction of gas flow along the gas flow path.

27. The scrubbing apparatus defined in claim 26, and means for varying the degree of tension of the resilient vibratory sheet means.

28. The apparatus defined in claim 20, and means connecting the hard sheet means and the vibratory sheet means for effecting stretching of the vibratory sheet means by the hard sheet means.

29. The scrubbing apparatus defined in claim 28, and means for adjusting the degree of stretching of the resilient vibratory sheet means by the hard sheet means.

30. The apparatus defined in claim 19, in which the resilient vibratory sheet means includes a resilient strip of an extent transversely of the direction of gas flow a plurality of times as great as the extent of the strip parallel of the direction of gas flow.

31. The apparatus defined in claim 19, in which the resilient vibratory sheet means includes a boot receiving gas from the passage means, and opposite sides of the discharge end of which said boot form the resilient vibratory sheet means.

32. The apparatus defined in claim 31, and hard separator sheet means located between the sides of the boot adjacent to its discharge end and disposed substantially parallel to the sides of the boot.

33. The apparatus defined in claim 31, in which the opposite sides of the boot have slits therein forming opposite strip means.

34. The apparatus defined in claim 33, in which the slits extend transversely of the direction of gas flow through the boot and form strips extending transversely of the gas flow through the boot.

35. The apparatus defined in claim 33, in which the slits extend generally parallel to the direction of gas flow through the boot and open at the end of the boot from which gas is discharged.

36. Dynamic gas-agitating apparatus comprising resilient vibratory sheet means including two resilient sheet members in generally parallel side-by-side relationship, and hard separator sheet means located between said resilient sheet members and disposed substantially parallel to said resilient sheet members.

37. Scrubbing apparatus for purifying gas comprising passage means including an inlet and an outlet, establishing a gas flow path for flow of gas through the apparatus from said inlet to said outlet, scrubbing liquid supply means for supplying scrubbing liquid to polluted gas to be scrubbed flowing along such path, two resilient vibratory sheet members in generally parallel, side-by-side relationship disposed substantially parallel to the direction of gas flow along the gas flow path for flailing the polluted gas and scrubbing liquid, and hard separator sheet means located between said resilient vibratory sheet members and disposed substantially parallel to said resilient vibratory sheet members to be struck by said resilient vibratory sheet members by flailing of said resilient vibratory sheet members effected by flow of gas between said resilient vibratory sheet members.

38. The scrubbing apparatus defined in claim 37, and means connecting the hard separator sheet means and the resilient vibratory sheet members for effecting stretching of the resilient sheet members by the hard separator sheet means in a direction transversely of the flow of gas between the resilient sheet members.

39. The scrubbing apparatus defined in claim 38, and means for adjusting the degree of stretching of the resilient vibratory sheet members effected by the hard separator sheet means.

40. Scrubbing apparatus for purifying gas comprising two resilient vibratory sheet members in generally parallel, closely adjacent, side-by-side relationship forming a gas flow path slit therebetween, means for effecting flow of polluted gas through said gas flow path slit, and scrubbing liquid supply means for supplying scrubbing liquid to such polluted gas.

41. The scrubbing apparatus defined in claim 40, and means for stretching the two resilient vibratory sheet members in a direction transversely of the direction of gas flow therebetween.

42. The scrubbing apparatus defined in claim 41, and means for adjusting the degree of stretching of the resilient vibratory sheet members.

* * * * *

UNITED STATES PATENT AND TRADEMARK OFFICE
CERTIFICATE OF CORRECTION

PATENT NO. : 4,734,108
DATED : March 29, 1988
INVENTOR(S) : Cox et al.

It is certified that error appears in the above-identified patent and that said Letters Patent are hereby corrected as shown below:

Column 4, line 10, change "agitators" to --agitator--.

Column 4, line 11, change "35" to --32--.

Column 4, line 13, change "35" to --32--.

Column 8, line 32, change "atomized" to --atomize--.

Column 14, line 20, after "extension" insert --pipe 112. As shown in Figures 24 and 26, the elastomeric strips 118 have lengths and widths approximately equal to the length and width of the hard strip 117, i.e., lengths extending transversely of the direction of gas flow 10 to 15 times as great as their widths parallel to the direction of gas flow. Preferably such resilient strips are--.

Column 17, line 26, change "8" to --38--.

Claim 4: column 20, line 2, after "through" insert --the apparatus from said inlet to said outlet, scrubbing--;

column 20, lines 11 and 12, change "enchancing" to --enhancing--;

column 20, line 12, cancel "and" (second instance).

UNITED STATES PATENT AND TRADEMARK OFFICE
CERTIFICATE OF CORRECTION

PATENT NO. : 4,734,108

DATED : March 29, 1988

INVENTOR(S) : Cox et al.

It is certified that error appears in the above-identified patent and that said Letters Patent are hereby corrected as shown below:

Claim 5:    column 20, line 15, change "viratory" to --vibratory--;

column 20, line 17, cancel "a" and insert --said--.

Claim 6:    column 20, line 20, after "inlet" insert --and an outlet, establishing a gas flow path for flow of gas--.

Claim 7:    column 20, line 32, change "scrubbng" to --scrubbing--.

Claim 18:   column 21, line 7, change "descharged" to --discharged--.

Claim 19:   column 21, line 9, cancel "passing" and insert --passage--;

column 21, line 11, cancel "for" (first instance) and insert --from--.

Claim 22:   column 21, line 32, change "failing" to --flailing--.

Claim 29:   column 21, line 55, cancel "scrubbing".

Claim 30:   column 21, line 62, cancel "of" (first instance) and insert --to--.

UNITED STATES PATENT AND TRADEMARK OFFICE
CERTIFICATE OF CORRECTION

PATENT NO. : 4,734,108

DATED : March 29, 1988

INVENTOR(S) : Cox et al

It is certified that error appears in the above-identified patent and that said Letters Patent is hereby corrected as shown below:

Claim 37: column 22, line 24, change "purfying" to --purifying--.

Signed and Sealed this

Thirteenth Day of September, 1988

Attest:

DONALD J. QUIGG

Attesting Officer

Commissioner of Patents and Trademarks